US012726706B2

(12) United States Patent
Wang

(10) Patent No.: US 12,726,706 B2
(45) Date of Patent: Sep. 1, 2026

(54) VOICE COIL MOTOR, CAMERA, AND ELECTRONIC DEVICE

(71) Applicant: GUANGDONG OPPO MOBILE TELECOMMUNICATIONS CORP., LTD., Dongguan (CN)

(72) Inventor: Weicheng Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 332 days.

(21) Appl. No.: 18/460,084

(22) Filed: Sep. 1, 2023

(65) Prior Publication Data

US 2023/0418086 A1 Dec. 28, 2023

Related U.S. Application Data

(63) Continuation of application No. PCT/CN2022/078429, filed on Feb. 28, 2022.

(30) Foreign Application Priority Data

Mar. 8, 2021 (CN) ........................ 202110252612.X

(51) Int. Cl.

*H04N 23/68* (2023.01)
*G03B 3/10* (2021.01)
(Continued)

(52) U.S. Cl.

CPC ........... *H04N 23/687* (2023.01); *H04N 23/54* (2023.01); *H04N 23/55* (2023.01); *H04N 23/57* (2023.01); *G03B 3/10* (2013.01); *G03B 30/00* (2021.01)

(58) Field of Classification Search

None
See application file for complete search history.

(56) References Cited

U.S. PATENT DOCUMENTS 10,715,730 B1 7/2020 Xu et al.
2017/0351158 A1 12/2017 Kudo
(Continued)

FOREIGN PATENT DOCUMENTS

CN 201402344 2/2010
CN 102820759 12/2012
(Continued)

OTHER PUBLICATIONS

EPO, Extended European Search Report for EP Application No. 22766086.7, Sep. 13, 2024.
(Continued)

*Primary Examiner* — Paul M Berardesca
(74) *Attorney, Agent, or Firm* — Hodgson Russ LLP

(57) ABSTRACT

A voice coil motor includes an autofocus mechanism and an in-body image stabilization (IBIS) mechanism. The autofocus mechanism includes a first base, a cover, a coil assembly disposed between the first base and the cover, and a magnetic assembly arranged on the cover and around the coil assembly. The IBIS mechanism includes a second base disposed at one side of the first base away from the cover and a coil module arranged on the second base. When the coil assembly is energized, a first electromagnetic force is generated between the coil assembly and the magnetic assembly to drive the coil assembly to move in an axial direction, thereby achieving an autofocusing function. When the coil module is energized, a second electromagnetic force is generated between the coil module and the magnetic assembly to drive the second base and the coil module to move relative to the first base.

19 Claims, 15 Drawing Sheets

(51) Int. Cl.

| | |
|---|---|
| ***G03B 30/00*** | (2021.01) |
| ***H04N 23/54*** | (2023.01) |
| ***H04N 23/55*** | (2023.01) |
| ***H04N 23/57*** | (2023.01) |

(56) References Cited

U.S. PATENT DOCUMENTS

| | | | | |
|---|---|---|---|---|
| 2020/0333686 | A1 | 10/2020 | Kim | |
| 2021/0208417 | A1* | 7/2021 | Choi | H04N 23/57 |
| 2021/0258491 | A1* | 8/2021 | Park | H04N 23/54 |
| 2024/0004265 | A1* | 1/2024 | Liu | H04N 23/54 |

FOREIGN PATENT DOCUMENTS

| | | |
|---|---|---|
| CN | 103185942 | 7/2013 |
| CN | 104079138 | 10/2014 |
| CN | 104570547 | 4/2015 |
| CN | 204903924 | 12/2015 |
| CN | 107247382 | 10/2017 |
| CN | 107277338 | 10/2017 |
| CN | 104407487 | 2/2018 |
| CN | 107707083 | 2/2018 |
| CN | 207200555 | 4/2018 |
| CN | 207676095 | 7/2018 |
| CN | 108377087 | 8/2018 |
| CN | 108490579 | 9/2018 |
| CN | 208156280 | 11/2018 |
| CN | 208158393 | 11/2018 |
| CN | 110780507 | 2/2020 |
| CN | 111083340 | 4/2020 |
| CN | 111147708 | 5/2020 |
| CN | 211508878 | 9/2020 |
| CN | 211530986 | 9/2020 |
| CN | 112415708 | 2/2021 |
| CN | 113037045 | 6/2021 |
| EP | 3239755 | 11/2017 |
| EP | 3521922 | 8/2019 |
| EP | 3588185 | 1/2020 |
| EP | 3719554 | 10/2020 |
| JP | 2016184132 | 10/2016 |
| TW | M533761 | 12/2016 |

OTHER PUBLICATIONS

EPO, Extended European Search Report for EP Application No. 22766183.2, Jul. 8, 2024.

WIPO, International Search Report and Written Opinion for International Application No. PCT/CN2022/072697, Apr. 13, 2022.

CNIPA, First Office Action for CN Application No. 202110252510.8, Dec. 1, 2021.

CNIPA, Second Office Action for CN Application No. 202110252510.8, Mar. 22, 2022.

WIPO, International Search Report and Written Opinion for International Application No. PCT/CN2022/078429, Apr. 24, 2022.

CNIPA, First Office Action for CN Application No. 202110252612.X, Oct. 13, 2021.

USPTO, Non-Final Office Action for U.S. Appl. No. 18/447,282, filed Aug. 28, 2025.

* cited by examiner

VOICE COIL MOTOR, CAMERA, AND ELECTRONIC DEVICE

CROSS-REFERENCE TO RELATED APPLICATION(S)

The application is a continuation of International Application No. PCT/CN2022/078429, filed Feb. 28, 2022, which claims priority to Chinese Patent Application No. 202110252612.X, filed Mar. 8, 2021, the entire disclosures of which are incorporated herein by reference.

TECHNICAL FIELD

The disclosure relates to the field of electric control apparatuses, and in particular, to a voice coil motor, a camera provided with the voice coil motor, and an electronic device provided with the camera.

BACKGROUND

Image stabilization of cameras on the market is classified into lens stabilization and in-body image stabilization (IBIS). The lens stabilization can change and correct a light path during shaking by utilizing a displacement of a lens group, achieving stabilization compensation. The IBIS can achieve stabilization compensation by utilizing a displacement of a photosensitive chip. A voice coil motor of a camera of an existing mobile phone generally only offers lens stabilization. With the rapid development of the mobile phone industry and increasingly faster technology innovation, consumers have increasingly stringent requirements for photographic capabilities of mobile phones, and cameras of the mobile phones have been evolving towards the level of single lens reflex (SLR) cameras. Consequently, there is a need to design a voice coil motor capable of achieving both a focus function and an IBIS function.

SUMMARY

The disclosure aims to provide a voice coil motor capable of achieving an autofocus function and an in-body image stabilization (IBIS) function, a camera provided with the voice coil motor, and an electronic device provided with the camera.

In order to solve the above technical problem, a voice coil motor is provided in the disclosure. The voice coil motor includes an autofocus mechanism and an in-body image stabilization (IBIS) mechanism. The autofocus mechanism includes a first base, a cover arranged on the first base, a coil assembly disposed between the first base and the cover, and a magnetic assembly arranged on the cover and around the coil assembly. The IBIS mechanism includes a second base disposed at one side of the first base away from the cover and a coil module arranged on the second base. When the coil assembly is energized, a first electromagnetic force is generated between the coil assembly and the magnetic assembly to drive the coil assembly to move in an axial direction. When the coil module is energized, a second electromagnetic force is generated between the coil module and the magnetic assembly to drive the second base and the coil module to move relative to the first base.

A camera is further provided in the disclosure. The camera includes the voice coil motor, a lens module, and a photosensitive chip disposed at the voice coil motor. The lens module is connected to the coil assembly of the voice coil motor, the voice coil motor is configured to drive the coil assembly to move so that the lens module is driven to move under movement of the coil assembly, and the voice coil motor is further configured to drive the photosensitive chip to move relative to the lens module.

An electronic device is further provided in the disclosure. The electronic device includes a housing, a main board disposed inside the housing, and the camera. The camera is disposed inside the housing and electrically connected to the main board.

BRIEF DESCRIPTION OF THE DRAWINGS

To describe technical solutions in implementations of the disclosure more clearly, the following briefly introduces the accompanying drawings required for describing the implementations. Apparently, the accompanying drawings in the following description only illustrate some implementations of the disclosure. Those of ordinary skill in the art may also obtain other drawings based on these accompanying drawings without creative efforts.

DETAILED DESCRIPTION

Figure 1:
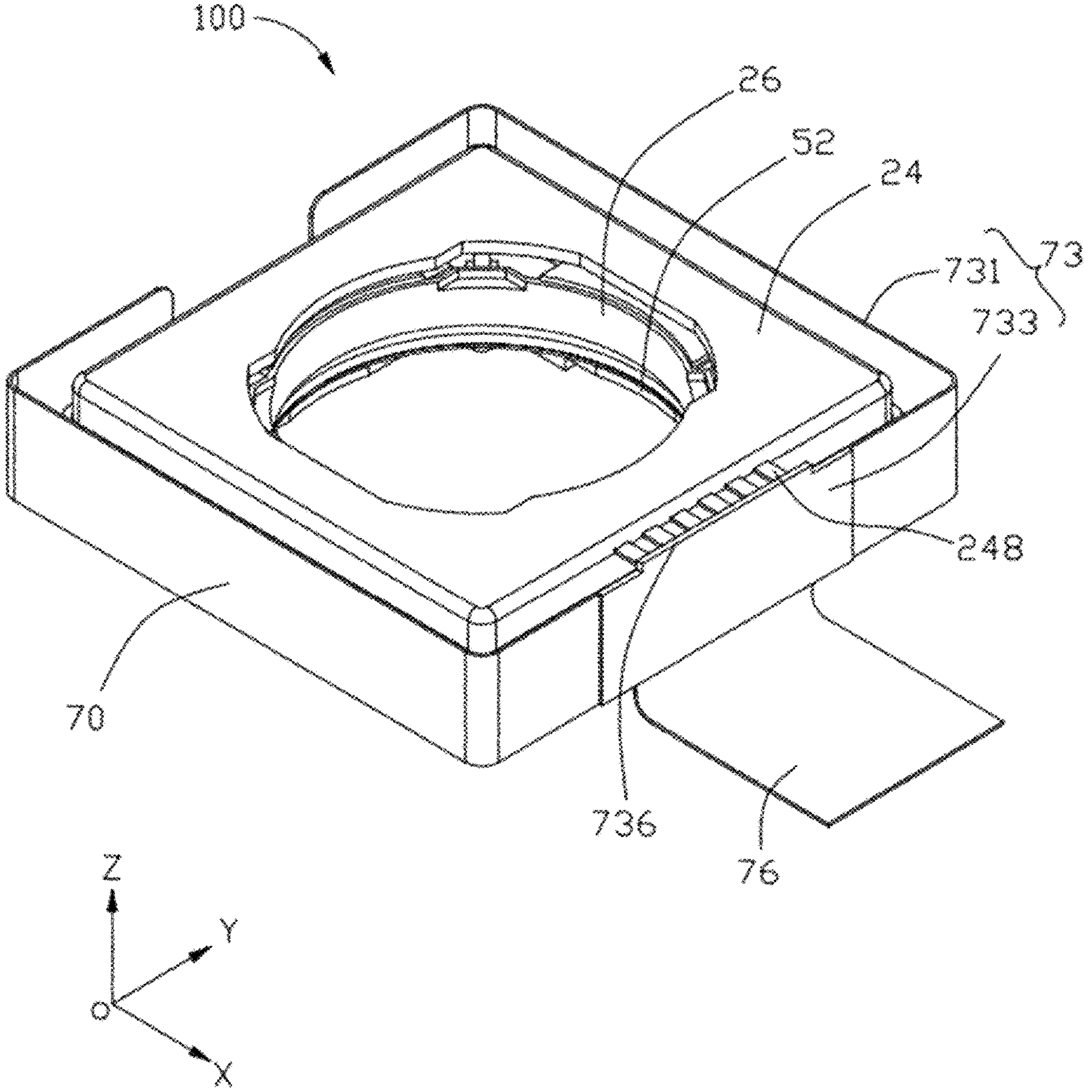
FIG. 1 is a schematic perspective structural view of a voice coil motor provided in an implementation of the disclosure.

A voice coil motor includes an autofocus mechanism and an in-body image stabilization (IBIS) mechanism. The autofocus mechanism includes a first base, a cover arranged on the first base, a coil assembly disposed between the first base and the cover, and a magnetic assembly arranged on the cover and around the coil assembly. The IBIS mechanism includes a second base disposed at one side of the first base away from the cover and a coil module arranged on the second base. When the coil assembly is energized, a first electromagnetic force is generated between the coil assembly and the magnetic assembly to drive the coil assembly to move in an axial direction. When the coil module is energized, a second electromagnetic force is generated between the coil module and the magnetic assembly to drive the second base and the coil module to move relative to the first base.

The second electromagnetic force between the coil module and the magnetic assembly is configured to drive the second base and the coil module to move relative to the first base along a plane perpendicular to the axial direction, and/or to drive the second base and the coil module to rotate relative to the first base about an axis parallel to the axial direction.

The magnetic assembly includes at least one pair of first magnetic members. The coil module includes at least one pair of first coils corresponding to the at least one pair of first magnetic members. When the at least one pair of first coils is energized, a first component of the second electromagnetic force is generated between the at least one pair of first coils and the at least one pair of first magnetic members to drive the second base and the coil module to move relative to the first base in a first direction, and the first direction is perpendicular to the axial direction.

The magnetic assembly includes at least one pair of second magnetic members, and the coil module includes at least one pair of second coils corresponding to the at least one pair of second magnetic members. When the at least one pair of second coils is energized, and a second component of the second electromagnetic force is generated between the at least one pair of second coils and the at least one pair of second magnetic members to drive the second base and the coil module to move relative to the first base in a second direction, and the second direction is perpendicular to the first direction and the axial direction.

The at least one pair of first coils includes at least two pairs of first coils and/or the at least one pair of second coils includes at least two pairs of second coils. When the at least two pairs of first coils are energized and/or the at least two pairs of second coils are energized, a component of the second electromagnetic force generated between one pair of the at least two pairs of first coils and the at least one pair of first magnetic members is different from another component of the second electromagnetic force generated between another pair of the at least two pairs of first coils and the at least one pair of first magnetic members and/or a component of the second electromagnetic force generated between one pair of the at least two pairs of second coils and the at least one pair of second magnetic members is different from another component of the second electromagnetic force generated between another pair of the at least two pairs of second coils and the at least one pair of second magnetic members, so that the second base and the coil module are driven to rotate relative to the first base about the axis parallel to the axial direction.

The IBIS mechanism further includes a flexible circuit board electrically connected to the coil module, and the flexible circuit board is provided with a first magnetic induction driving element corresponding to the first magnetic member and a second magnetic induction driving element corresponding to the second magnetic member.

The second base is provided with a magnetic conductive member corresponding to the magnetic assembly, the magnetic conductive member and the magnetic assembly magnetically attract each other, the second base is connected to the first base through multiple universal balls, and the second base is spaced apart from the first base.

The second base is provided with multiple positioning portions around the coil assembly at one side of the second base facing the first base, the multiple positioning portions are arranged in at least one circle in a circumferential direction of the coil assembly, and the multiple universal balls are rotatably disposed in the multiple positioning portions, respectively.

The first base defines multiple first ball grooves on a side surface of the first base facing the second base. The multiple first ball grooves are arranged in at least one circle in a circumferential direction of the coil assembly. The second base defines multiple second ball grooves on a side surface of the second base facing the first base, the multiple second ball grooves respectively correspond to the multiple first ball grooves, and each of the multiple first ball grooves and a corresponding one of the multiple second ball grooves cooperate to receive the universal ball.

A first anti-collision member is disposed at a position where the first base is in contact with the universal ball, and a second anti-collision member is disposed at a position where the positioning portion is in contact with the universal ball.

A magnetic conductive member is disposed in the cover, and the magnetic assembly and the magnetic conductive member attract each other to position the magnetic assembly to the cover.

The cover is provided with multiple damping pins extending towards the coil assembly, the coil assembly includes a carrier, the carrier defines multiple damping holes respectively corresponding to the multiple damping pins, and each of the multiple damping pins is inserted into a corresponding one of the multiple damping holes.

Each of the multiple damping hole is provided with a damping material.

The carrier is provided with multiple first collision bosses at an upper surface of the carrier and multiple second collision bosses at a lower surface of the carrier.

The autofocus mechanism further includes a first resilient member connected between the coil assembly and the cover and a second resilient member connected between the coil assembly and the first base, and the first resilient member and the second resilient member are configured to move the coil assembly to reset.

The voice coil motor further includes a circuit board module disposed at one side of the second base away from the first base. The circuit board module is electrically connected to the coil assembly and the coil module.

The circuit board module includes a bottom plate arranged on the second base and a conductive member connected to and surrounding the bottom plate, the bottom plate is electrically connected to the coil module, the conductive member is electrically connected to the coil assembly, and an avoidance groove is defined between part of the conductive member and the bottom plate.

A metal wire is disposed inside the cover and electrically connected to the coil assembly, and one end of the metal wire extends to the outside of the cover to be connected to the conductive member.

A camera includes the voice coil motor, a lens module, and a photosensitive chip disposed at the voice coil motor. The lens module is connected to the coil assembly of the voice coil motor, the voice coil motor is configured to drive the coil assembly to move so that the lens module is driven to move under movement of the coil assembly, and the voice coil motor is further configured to drive the photosensitive chip to move relative to the lens module.

An electronic device includes a housing, a main board disposed inside the housing, and the camera. The camera is disposed inside the housing and electrically connected to the main board.

The following clearly and completely describes the technical solutions in the implementations of the disclosure with reference to the accompanying drawings in the implementations of the disclosure. Apparently, the described implementations are merely part rather than all of the implementations of the disclosure. The implementations described herein can be combined with each other appropriately. All other implementations obtained by those of ordinary skill in the art based on the implementations of the disclosure without creative efforts shall fall within the protection scope of the disclosure.

In addition, the following illustrations of various implementations are provided with reference to the accompanying drawings to illustrate specific implementations that can be implemented in the disclosure. Directional terms such as "up", "down", "front", "back", "left", "right", "inside", "outside", "side", and the like referred to herein which are only for directions with reference to the accompanying drawings. Therefore, the directional terms used herein are intended to better and more clearly illustrate and understand the disclosure, rather than explicitly or implicitly indicate that devices or elements referred to herein must have a certain direction or be configured or operated in a certain direction and therefore cannot be understood as limitation on the disclosure.

It is noted that, in the illustrations of the disclosure, terms "mount", "couple", "connect", "interconnect", and "disposed" should be understood in a broad sense unless otherwise expressly specified and limited. For example, the terms "mount", "couple", "connect", "interconnect", and "disposed" may refer to fixedly connect, detachably connect, or integrally connect, may refer to mechanically connect, and may refer to a directly connect, indirectly connect through an intermediate medium, or an intercommunicate interiors of two elements. For those of ordinary skill in the art, the specific meanings of the above terms in the disclosure can be understood according to specific situations.

Figure 2:
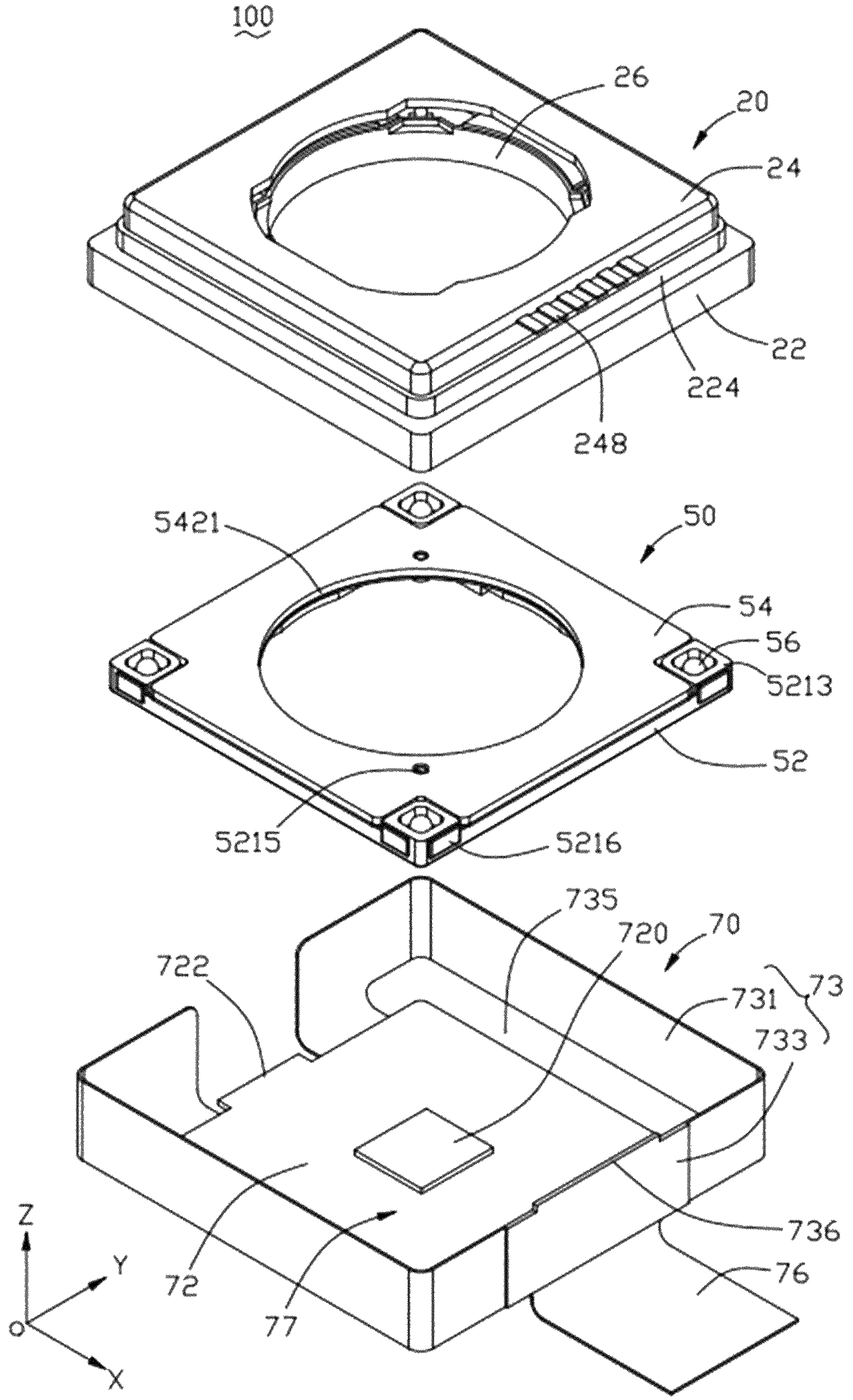
FIG. 2 is a schematic exploded perspective structural view of the voice coil motor in FIG. 1.
Figure 3:
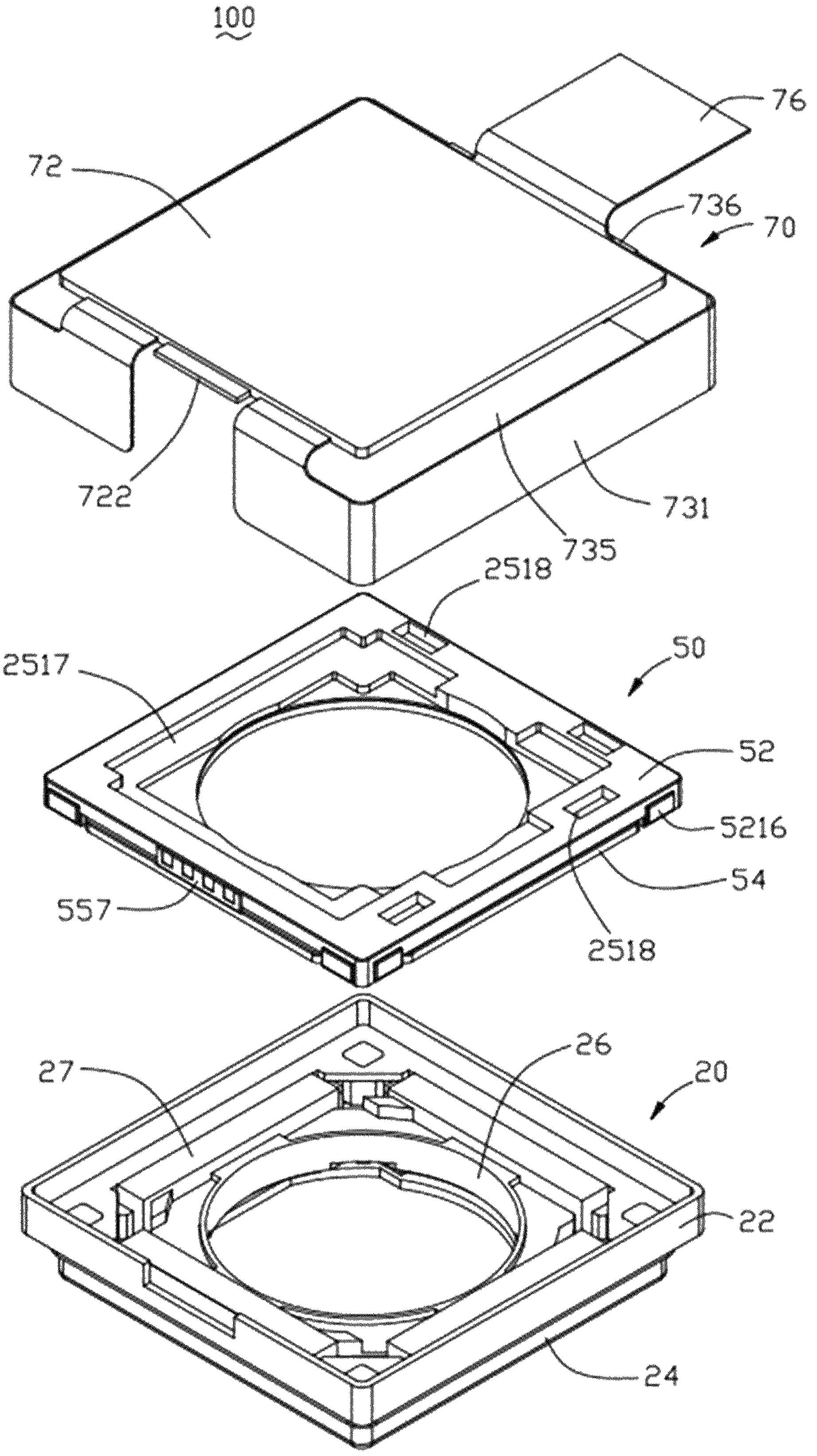
FIG. 3 is a schematic perspective structural view of the voice coil motor in FIG. 2, viewed from another direction.
Figure 4:
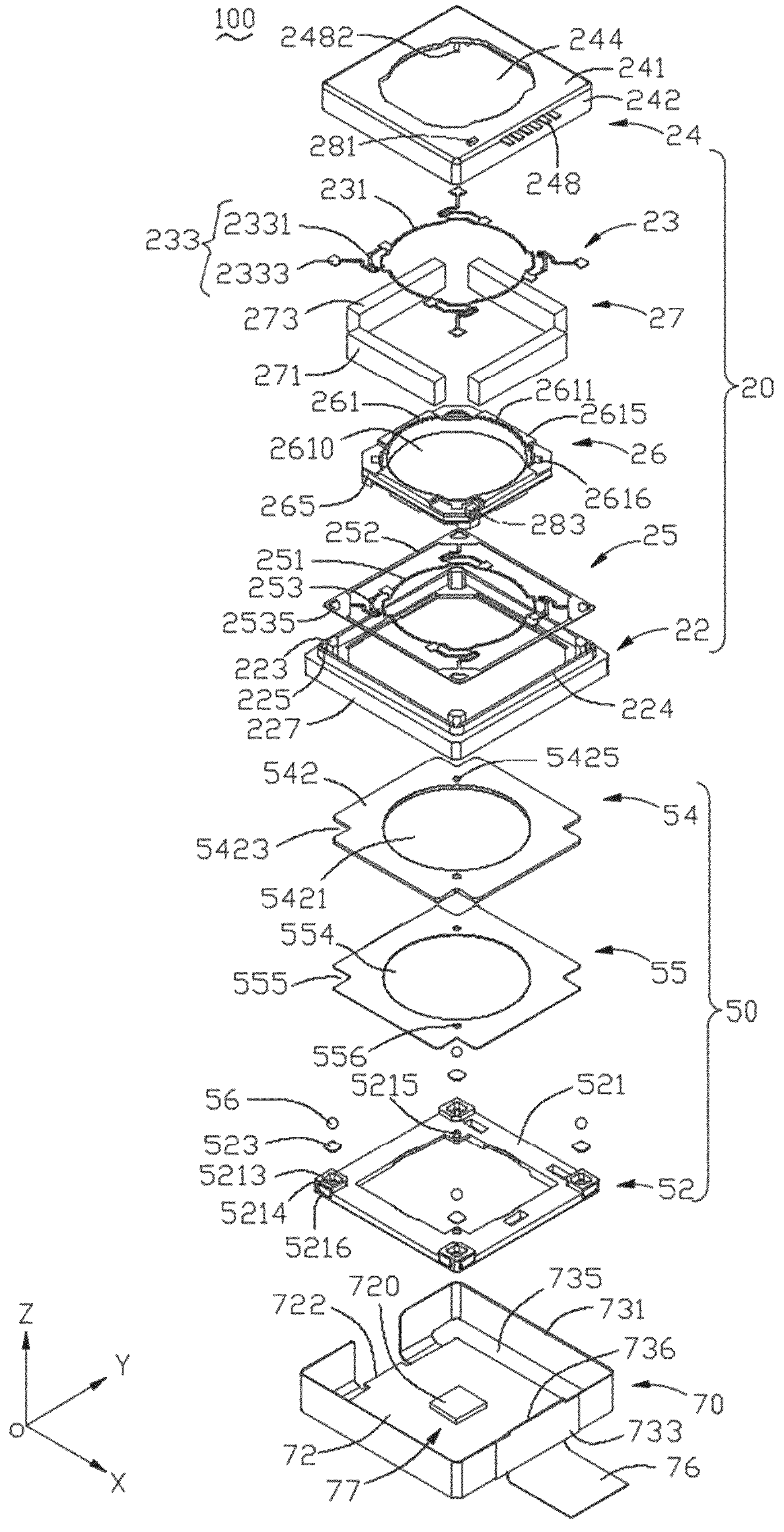
FIG. 4 is a further schematic perspective structural view of the voice coil motor in FIG. 2.
Figure 5:
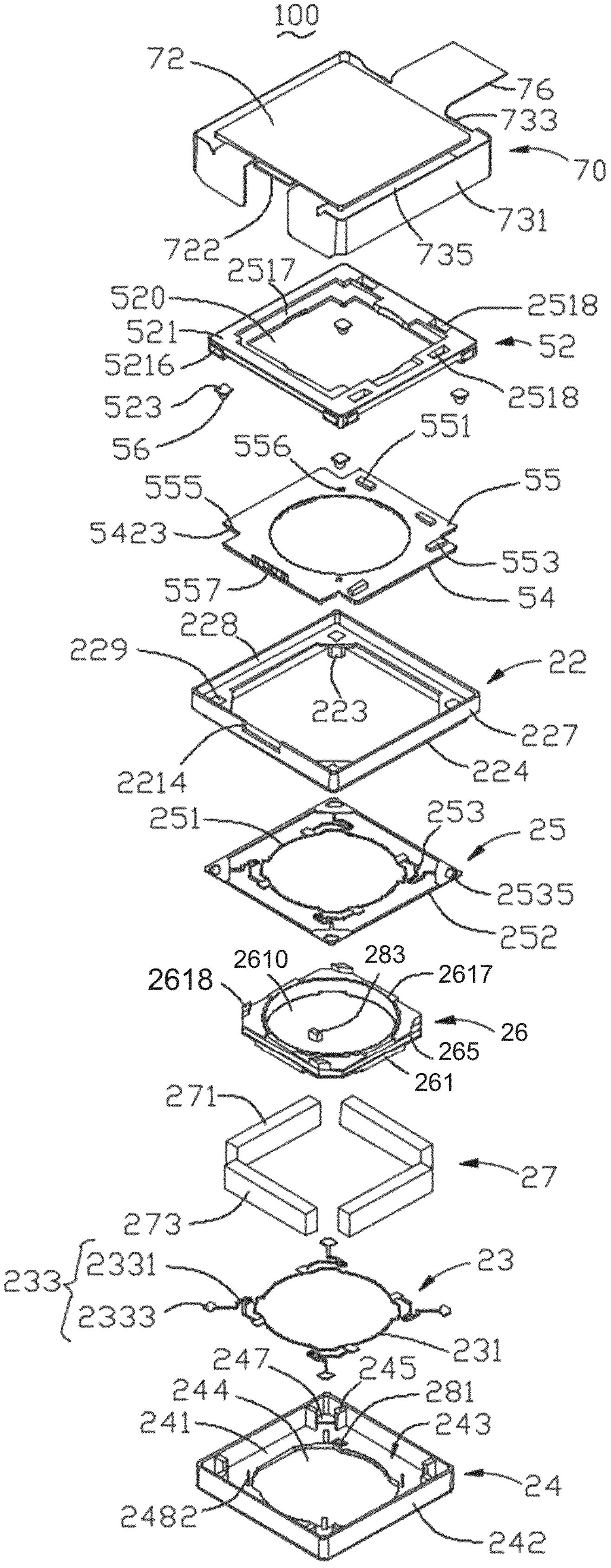
FIG. 5 is a schematic perspective view of the voice coil motor in FIG. 4, viewed from another direction.

Referring to FIGS. 1 to 5, FIG. 1 is a schematic perspective structural view of a voice coil motor 100 provided in an implementation of the disclosure, FIG. 2 is a schematic exploded perspective structural view of the voice coil motor 100 in FIG. 1, FIG. 3 is a schematic perspective structural view of the voice coil motor 100 in FIG. 2, viewed from another direction, FIG. 4 is a further schematic perspective structural view of the voice coil motor 100 in FIG. 2, and FIG. 5 is a schematic perspective view of the voice coil motor 100 in FIG. 4, viewed from another direction. The voice coil motor 100 provided in an implementation of the disclosure includes an autofocus mechanism 20 and an in-body image stabilization (IBIS) mechanism 50. The autofocus mechanism 20 includes a first base 22, a cover 24 arranged on the first base 22, a coil assembly 26 disposed between the first base 22 and the cover 24, a magnetic assembly 27 arranged on the cover 24 and around the coil assembly 26, a first resilient member 23 connected between the first base 22 and the coil assembly 26, and a second resilient member 25 connected between the first base 22 and the coil assembly 26. The magnetic assembly 27 surrounds the coil assembly 26. The first resilient member 23 and the second resilient member 25 are configured to move the coil assembly 26 to reset. The IBIS mechanism 50 includes a second base 52 disposed at one side of the first base 22 away from the cover 24 and a coil module 54 arranged on the second base 52, and the coil module 54 corresponds to the magnetic assembly 27. When the coil assembly 26 is energized, a first electromagnetic force is generated between the coil assembly 26 and the magnetic assembly 27 to drive the coil assembly 26 to move in an axial direction. When the coil module 54 is energized, a second electromagnetic force is generated between the coil module 54 and the magnetic assembly 27 to drive the second base 52 and the coil module 54 to move relative to the first base 22. A direction parallel to an axis of the coil assembly 26 is referred to as the axial direction, that is, the axial direction is a Z-axis direction as illustrated in figures. In some implementations of the disclosure, the coil module 54 may be a planar coil. In some implementations, the axial direction is a direction parallel to a center axis of the coil assembly 26.

During usage of the voice coil motor 100, the coil assembly 26 is energized so that the first electromagnetic force is generated between the coil assembly 26 and the magnetic assembly 27 to drive the coil assembly 26 where a lens is located to move axially, thereby achieving an autofocus function; the coil module 54 is energized so that the second electromagnetic force is generated between the coil module 54 and the magnetic assembly 27 to drive the coil module 54 where a photosensitive chip is located and the second base 52 to move along a XOY plane and/or implement an axial rotation to compensate lens shaking, thereby achieving an IBIS function. Thus, an image-stabilization performance of the voice coil motor 100 is significantly enhanced. The axial rotation refers to that the second base 52 and the coil module 54 rotate about an axis that is parallel to the axial direction of the coil assembly 26. The coil assembly 26 is energized so that the first electromagnetic force is generated between the coil assembly 26 and the magnetic assembly 27 to drive the coil assembly 26 where the lens is located to move in the axial direction, the coil module 54 is energized so that the second electromagnetic force is generated between the coil module 54 and the magnetic assembly 27 to drive the coil module 54 where the photosensitive chip is located and the second base 52 to move along the XOY plane and/or to rotate about the axial direction to compensate lens shaking, thereby achieving the IBIS function. The photosensitive chip is attached to the coil module 54, and the coil module 54 is attached to the second base 52, that is, the photosensitive chip, the coil module 54, and the second base 52 are separated from the coil assembly 26, thereby achieving a reduction in the weight of the coil assembly 26.

The coil assembly 26 of the voice coil motor 100 provided in the disclosure is disposed between the first base 22 and the cover 24, and the magnetic assembly 27 is arranged on the cover 24 and surrounds the coil assembly 26. The second base 52 is disposed at one side of the first base 22 away from the cover 24, and the coil module 54 is disposed at the second base 52. That is, the coil assembly 26 is disposed at one side of the first base 22, and the second base 52 and the coil module 54 are disposed at the other side of the first base 22. In this way, both the autofocus mechanism 20 and the IBIS mechanism 50 of the disclosure are connected to the first base 22, movement of the autofocus mechanism 20 can be achieved through cooperation between the coil assembly 26 and the magnetic assembly 27, and movement of the IBIS mechanism 50 can be achieved through cooperation between the coil modules 54 and the magnetic assembly 27. That is, movement of the autofocus mechanism 20 relative to the first base 22 can be independent of movement of the IBIS mechanism 50 relative to the first base 22, thereby achieving a reduction in the weight of the autofocus mechanism 20 where the lens is located, and enhancing a reliability of the voice coil motor 100. In addition, the magnetic assembly 27 can be shared by the autofocus mechanism 20 and the IBIS mechanism 50, which can not only enhance the image-stabilization performance of the voice coil motor 100 and reduce manufacturing costs of components, but also can achieve a reduction in an axial size of the voice coil motor 100, and due to the reduction in the axial size of the voice coil motor 100, the voice coil motor 100 may occupy less internal space of an electronic device, thereby facilitating arrangements of other electronic elements of the electronic device.

The second electromagnetic force between the coil module 54 and the magnetic assembly 27 is configured to drive the second base 52 and the coil module 54 to move relative to the first base 22 along a plane perpendicular to the axial direction, and/or to drive the second base 52 and the coil module 54 to rotate relative to the first base 22 about an axis parallel to the axial direction. Specifically, when the coil module 54 is energized, the second electromagnetic force generated between the coil module 54 and the magnetic assembly 27 can drive the coil module 54 where the photosensitive chip is located and the first base 22 to move along the XOY plane and/or to rotate about the Z-axis direction to compensate lens shaking, thereby achieving the IBIS function.

Figure 6:
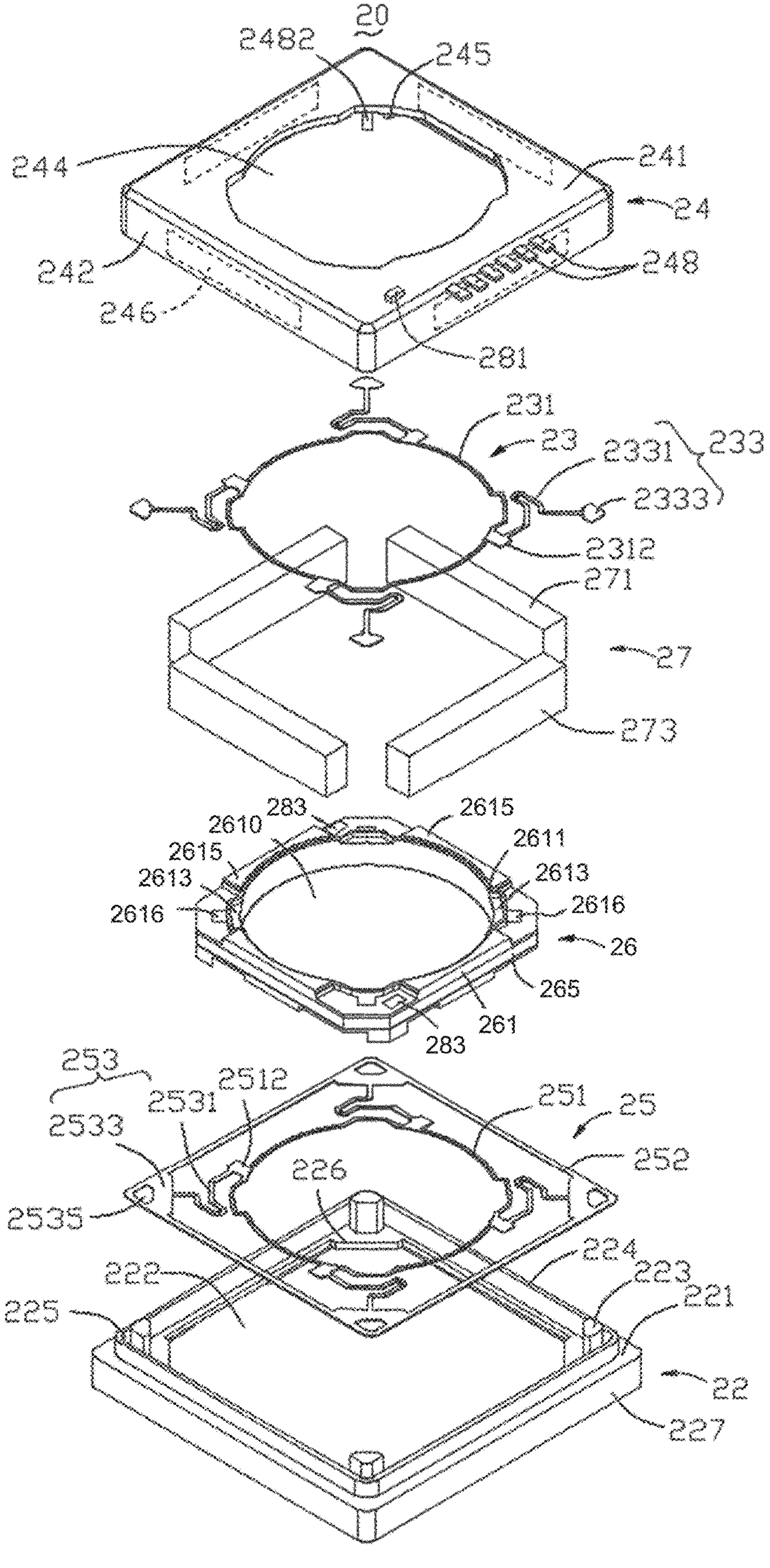
FIG. 6 is an enlarged perspective structural view of an autofocus mechanism in FIG. 2.
Figure 7:
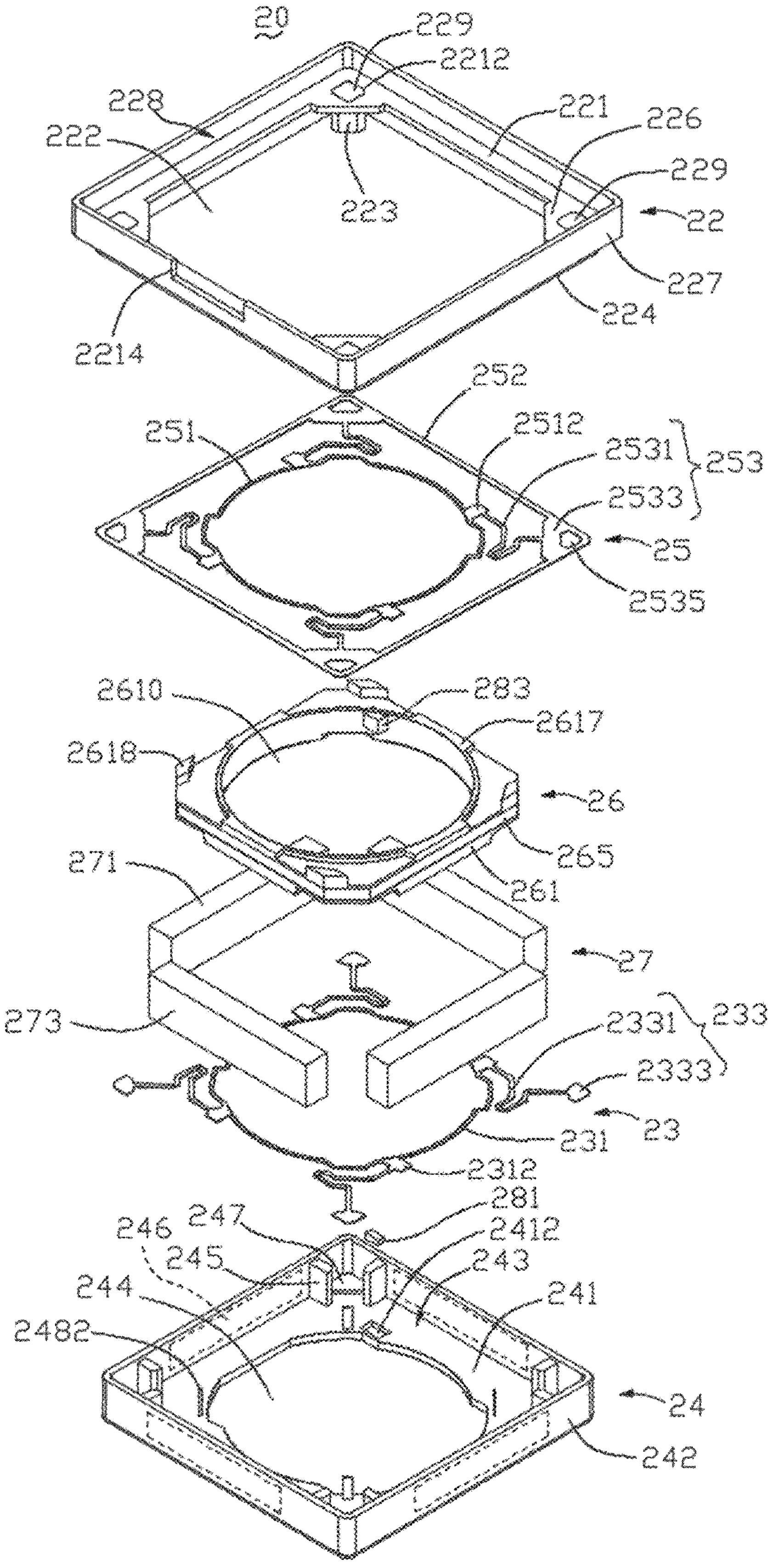
FIG. 7 is a schematic perspective structural view of the autofocus mechanism in FIG. 6, viewed from another direction.

Referring to FIGS. 4 to 7, FIG. 6 is an enlarged perspective structural view of the autofocus mechanism 20 in FIG. 2, and FIG. 7 is a schematic perspective structural view of the autofocus mechanism 20 in FIG. 6, viewed from another direction. The first base 22 is a hollow frame. The cover 24 is disposed at the top of the frame and the second base 52 is disposed at the bottom of the frame. An inner cavity of the cover 24 is in communication with an inner cavity of the frame. Specifically, the first base 22 includes a support plate 221. The support plate 221 defines a through hole 222 at the middle of the support plate 221. Multiple positioning posts 223 are arranged on an upper surface of the support plate 221 and around the through hole 222. The multiple positioning posts 223 are used for connecting the cover 24 to the first base 22. In some implementations, the multiple positioning posts 33 are evenly arranged in a circle in a circumferential direction of the through hole 222. A positioning ring 224 is disposed on the upper surface of the support plate 221 and surrounds the multiple positioning posts 223. Positioning grooves 225 are defined between the positioning posts 223 and the positioning ring 224. The positioning grooves 225 are used for positioning of the cover 24. In the implementations, the support plate 221 is a rectangular plate, and the through hole 222 is a rectangular hole defined at the middle of the rectangular plate. Each positioning post 223 protrudes from a corner of the upper surface of the support plate 221 adjacent to the through hole 222. The positioning ring 224 is a rectangular ring surrounding the four positioning posts 223, and each positioning post 223 and the positioning ring 224 defines one positioning groove 225. In some implementations, an axial length of the positioning post 223 is larger than an axial length of the positioning ring 224, and thus a contact area between the positioning posts 223 and the cover 24 can be increased, thereby enhancing connection stability between the cover 24 and the first base 22. A side surface of each positioning post 223 facing the positioning ring 224 is a circular arc surface to further increase the contact area between the positioning posts 223 and the cover 24.

In other implementations, the support plate 221 may be, but is not limited to, a circular plate, a polygonal plate, an elliptic plate, or the like. The through hole 222 may be, but is not limited to, a circular hole, a polygonal hole, an elliptic hole, or the like. The positioning posts 223 are arranged in at least one circle in the circumferential direction of the through hole 222. The positioning ring 224 may be, but is not limited to, a circular ring, a polygonal ring, an elliptic ring, or the like. The positioning ring 224 surrounds the multiple positioning posts 223, so that each positioning post 223 and the positioning ring 224 defines one positioning groove 225, where the positioning grooves 225 are used for positioning of the cover 24. Alternatively, the positioning ring 224 may be surrounded by the multiple positioning posts 223, so that each positioning post 223 and the positioning ring 224 defines one positioning groove 225, where the positioning grooves 225 are used for positioning of the cover 24.

In other implementations, the cover 24 may be connected to the first base 22 through, but not limited to, snap-fitting, adhesive bonding, screwing, or the like.

The support plate 221 is provided with multiple fixing portions 226 around the through hole 222. The multiple fixing portions 226 are connected to the second resilient member 25. In some implementations, the multiple fixing portions 226 are evenly arranged in the circumferential direction of the through hole 222. In the implementations, the support plate 221 is provided with four fixing portions 226 around the through hole 222. Each fixing portion 226 is a fixing piece extending from the support plate 221 towards a corresponding corner of the through hole 222. That is, the four fixing portions 226 are adjacent to the four positioning posts 223, respectively.

The support plate 221 is provided with a limit ring 227 extending from an edge of a lower surface of the support plate 221 towards a side away from the positioning ring 224. The limit ring 227 and the support plate 221 surround a space to define an accommodation space 228 in communication with the through hole 222, and the accommodation space 228 is used for accommodating the second base 52 and the coil module 54. In the implementations, the limit ring 227 is a rectangular ring. In other implementations, the limit ring 227 may be, but is not limited to, a circular ring, a polygonal ring, an elliptic ring, or the like. Multiple first anti-collision members 229 are disposed at the lower surface of the support plate 221 and around the through hole 222, and are arranged in at least one circle in a circumferential direction of the through hole 222. In some implementations, the multiple first anti-collision members 229 are evenly arranged in the circumferential direction of the through hole 222. In the implementations, the first anti-collision member 229 is an anti-collision piece disposed at the lower surface of the support plate 221, and the anti-collision piece is made of a hard wear-resistant material. Specifically, the support plate 221 defines a positioning groove 2212 at each corner of the lower surface of the support plate 221 adjacent to the through hole 222, and each first anti-collision member 229 is fixed in a corresponding positioning groove 2212. The positioning ring 224 defines an avoidance opening 2214 at one side of the limit ring 227 away from the positioning ring 224.

The cover 24 includes a cover plate 241 and side plates 242 surrounding the cover plate 241. The cover plate 241 and the side plates 242 surround a space to define an accommodation space 243. The accommodation space 243 is used for accommodating the coil assembly 26 and the magnetic assembly 27. The cover plate 241 defines a through hole 244 at the middle of the cover plate 241, the lens extends through the through hole 244, and the side plates 242 are fixedly connected to the first base 22. Specifically, the side plates 242 are snapped into the positioning grooves 225 of the first base 22, respectively. In the implementations, the cover plate 241 is a rectangular plate, the side plates 242 are disposed at four edges of the rectangular plate, respectively, and four side plates 242 are connected end to end. The cover 24 is provided with a fixing member 245 at an inner side surface of the cover 24, and the fixing member 245 is used for positioning the magnetic assembly 27 to the cover 24. The fixing member 245 can not only facilitate positioning of the magnetic assembly 27, but also facilitate adhesive dispensing to further fix the magnetic assembly 27. In the implementations, the fixing member 245 is a fixing block protruding from an inner side of the side plate 242, each side plate 242 is provided with one fixing member 245 at each of two opposite ends of each side plate 242, and two fixing members 245 cooperate to fix a magnetic member. A magnetic conductive member 246 is disposed in the cover 24, and the magnetic assembly 27 and the magnetic conductive member 246 attract each other to position the magnetic assembly 27 to the cover 24. In the implementations, the magnetic conductive member 246 is an iron piece embedded in the side plate 242, and in some implementations, each of the side plates 242 is embedded with an iron piece.

In other implementations, the magnetic conductive member 246 is embedded in the cover plate 241 at a position adjacent to the side plate 242, that is, at each position of the cover plate 241 adjacent to one side plate 242, an iron piece is embedded for further positioning of the magnetic assembly 27 to the cover 24.

In other implementations, the magnetic assembly 27 may be fixed to the cover 24 through but not limited to adhesive bonding or snap-fitting.

The cover plate 241 is provided with multiple connection portions 247 inside the cover plate 241, and the multiple connection portions 247 are connected to the first resilient member 23. Specifically, the cover plate 241 is provided with the multiple connection portions 247 on an inner side surface of the cover plate 241, where the multiple connection portions 247 are disposed around the through hole 244. In some implementations, the multiple connection portions 247 are evenly arranged in a circumferential direction of the through hole 244. In the implementations, the cover plate 241 is provided with four connection portions 247 at the inner side surface of the cover plate 241, that is, the four connection portions 247 are arranged at four corners of the inner side surface of the cover plate 241, respectively. At least one positioning slot 2412 is defined on the inner side surface of the cover plate 241, and the at least one positioning slot 2412 is used for accommodating the magnetic induction driving element 281. Multiple metal wires 248 are embedded in the cover 24, and electrically connected to the coil assembly 26 and the magnetic induction driving element 281. One end of each of the multiple metal wires 248 extends out of the cover 24 to form a connection terminal, and thus multiple connection terminals are formed, where the multiple connection terminals include positive and negative terminals, signal terminals, operating voltage terminals, etc. The magnetic induction driving element 281 is soldered to a corresponding metal wire 248 inside the cover plate 241. Some of the metal wires 248 extend to the connection portion 247, and the first resilient member 23 is connected to the metal wire 248 at the connection portion 247 through soldering. The cover 24 is provided with multiple damping pins 2482 extending towards the accommodation space 243 and arranged in the circumferential direction of the through hole 244. In the implementations, the multiple damping pins 2482 are respectively formed by four metal wires that extend towards the accommodation space 243 in the axial direction, and each pin is not used for conduction.

The coil assembly 26 includes a carrier 261 and a coil 265 wound around the carrier 261. The carrier 261 is a wire frame, and the coil 265 is fixed to the wire frame in an integrated winding manner. The carrier 261 defines a mounting hole 2610 axially extending through an upper surface and a lower surface of the carrier 261. The mounting hole 2610 is connected to the lens. The upper surface of the carrier 261 faces the same direction as a light-incident hole of the lens, and the lower surface of the carrier 261 faces away from the light-incident hole of the lens. The carrier 261 defines a positioning groove 2611 on an upper surface of the carrier 261, and the positioning groove 2611 surrounds the mounting hole 2610 and is connected to the first resilient member 23. The carrier 261 defines clamp grooves 2613 on the upper surface of the carrier 261, where the clamp grooves 2613 are disposed around the mounting hole 2610, and are used for clamping of the lens. In the implementations, the carrier 261 defines four clamp grooves 2613 on the upper surface of the carrier 261, where the four clamp grooves 2613 are disposed around the mounting hole 2610, and the clamp grooves 2613 are evenly arranged in a circumferential direction of the mounting hole 2610. The carrier 261 is provided with multiple first collision bosses 2615 on the upper surface of the carrier 261, and the first collision bosses 2615 can prevent the lens attached to the carrier 261 from being directly collided, thereby protecting the lens. The coil 265 is electrically connected to the metal wire 248 inside the cover 24 through the first resilient member 23.

The carrier 261 defines multiple damping holes 2616 respectively corresponding to the multiple damping pins 2482, and each damping pin 2482 is slidably inserted into a corresponding damping hole 2616, so that the carrier 261 is in slidable connection with the cover 24 with a damping force between the carrier 261 and the cover 24. Specifically, a damping material, such as a damping adhesive, is provided in each damping hole 2616, and the damping pin 2482 is axially inserted into the damping material, so that the carrier 261 is connected to the cover 24 with a damping force between the carrier 261 and the cover 24. In an example, each of the plurality of damping hole is filled with the damping material.

The carrier 261 is provided with an induction magnet 283 corresponding to the magnetic induction driving element 281 on the cover 24, and the magnetic induction driving element 281 and the induction magnet 283 cooperate to feed back an actual trajectory of movement of the carrier 261 relative to the cover 24, so that a current intensity and/or a current direction of the coil 265 can be adjusted, improving accuracy of trajectory of movement of the carrier 261 and accuracy of focusing of the autofocus mechanism 20. Specifically, when the carrier 264 moves axially relative to the cover 24 to perform auto focus (AF), a variation of a magnetic flux generated between the magnetic induction driving element 281 and the induction magnet 283 can be calculated, achieving an AF closed-loop control.

The carrier 261 is provided with a positioning ring 2617 and multiple second collision bosses 2618 at a lower surface of the carrier 261, where the positioning ring 2617 and the second collision bosses 2618 are disposed around the mounting hole 2610, and the positioning ring 2617 is used for positioning of the second resilient member 25. The second collision bosses 2618 can prevent the lens attached to the carrier 261 from being direct collided, thereby protecting the lens. In the implementations, four second collision bosses 2618 are arranged on the lower surface of the carrier 261 in a circle in a circumferential direction of the carrier 261 and respectively correspond to the four first collision bosses 2615 in the axial direction.

In some implementations, the multiple first collision bosses 2615 are disposed at a surface of the carrier 261 close to the cover 24, and the multiple second collision bosses 2618 are disposed at a surface of the carrier 261 close to the first base 22.

The magnetic assembly 27 includes at least one pair of first magnetic members 271 located at two opposite sides of the coil assembly 26 and at least one pair of second magnetic members 273 located at the other two opposite sides of the coil assembly 26. Two sides of each pair of first magnetic members 271 that face each other have the same polarity, and two sides of each pair of second magnetic members 273 that face each other have the same polarity. Specifically, both the first magnetic member 271 and the second magnetic member 273 are magnets, two sides of each pair of first magnetic members 271 facing each other are S-poles, and two sides of each pair of second magnetic members 273 facing each other are N-poles. Alternatively, two sides of each pair of first magnetic members 271 facing each other are N-poles, and two sides of each pair of second magnetic members 273 facing each other are S-poles. In the implementations, two sides of each pair of first magnetic members 271 facing each other are S-poles, and two sides of each pair of second magnetic members 273 facing each other are N-poles. Each pair of first magnetic members 271 and each pair of second magnetic members 273 surround the coil assembly 26.

The first resilient member 23 is connected between the coil assembly 26 and the cover 24, the second resilient member 25 is connected between the coil assembly 26 and the first base 22, and the first resilient member 23 and the second resilient member 25 are used to move the coil assembly 26 to reset. Specifically, the first resilient member 23 is connected between the carrier 261 and the cover plate 241, and the second resilient member 25 is connected between the carrier 261 and the first base 22. In the implementations, the first resilient member 23 is a resilient piece, and the first resilient member 23 includes a first connection ring 231 surrounding the coil assembly 26, and multiple first positioning portions 233 connected to an outer periphery of the first connection ring 231, where each of the first positioning portions 233 is connected between the cover 24 and the first connection ring 231. Specifically, the first connection ring 231 is a closed-ring formed by a thin strip, multiple fixing portions 2312 are arranged at the outer periphery of the first connection ring 231, and the multiple first positioning portions 233 are connected to the multiple fixing portions 2312, respectively. In the implementations, an inner diameter of the first connection ring 231 is equal to or slightly larger than a diameter of the mounting hole 2610 of the carrier 261, and an outer diameter of the first connection ring 231 is smaller than an outer diameter of the carrier 261. There are four fixing portions 233 evenly arranged in a circumferential direction of the first connection ring 231. There are four multiple first positioning portions 233 respectively connected to the four fixing portions 2312, and the four first positioning portions 233 are evenly arranged in the circumferential direction of the first connection ring 231. Each fixing portion 2312 is a lug connected to the first connection ring 231. Each first positioning portion 233 includes a connection branch 2331 that is connected to the fixing portion 2312 and has resiliency, and a positioning piece 2333 disposed at one end of the connection branch 2331 away from the fixing portion 2312. The positioning piece 2333 is connected to the connection portion 247 of the cover 24. A middle portion of the connection branch 2331 is curved.

The second resilient member 25 is also a resilient piece. The second resilient member 25 includes a second connection ring 251 surrounding the coil assembly 26, a support ring 252 surrounding and spaced apart from the second connection ring 251, and multiple second positioning portions 253 connected between the first connection ring 231 and the support ring 252. The second connection ring 251 is connected to the carrier 261, and the support ring 252 is connected to the first base 22. Specifically, the second connection ring 251 is a closed-ring formed by a thin strip, and is provided with multiple fixing portions 2512 at an outer periphery of the second connection ring 251, and the multiple second positioning portions 253 are connected to the multiple fixing portions 2512, respectively. In the implementations, an inner diameter of the second connection ring 251 is equal to or slightly larger than a diameter of the mounting hole 2610 of the carrier 261, and an outer diameter of the second connection ring 251 is smaller than an outer diameter of the carrier 261. There are four fixing portions 2512 evenly arranged in a circumferential direction of the second connection ring 251. There are four second positioning portions 253 connected to the four fixing portions 2512, respectively. The four second positioning portions 253 are evenly arranged in the circumference of the second connection ring 251. Each fixing portion 2512 is a lug connected to the second connection ring 251. Specifically, the second positioning portion 253 includes a connection branch 2531 connected to the fixing portion 2512 and has resiliency, and a positioning piece 2533 disposed at one end of the connection branch 2531 away from the fixing portion 2512. The positioning piece 2533 is connected to the support ring 252. In the implementations, the support ring 252 is a rectangular ring, the positioning pieces 2533 of the four second positioning portions 253 are respectively arranged at four corners of the support ring 252, and each positioning piece 2533 defines a positioning hole 2535 connected to a corresponding positioning post 223. A middle portion of the connection branch 2531 is curved.

Figure 8:
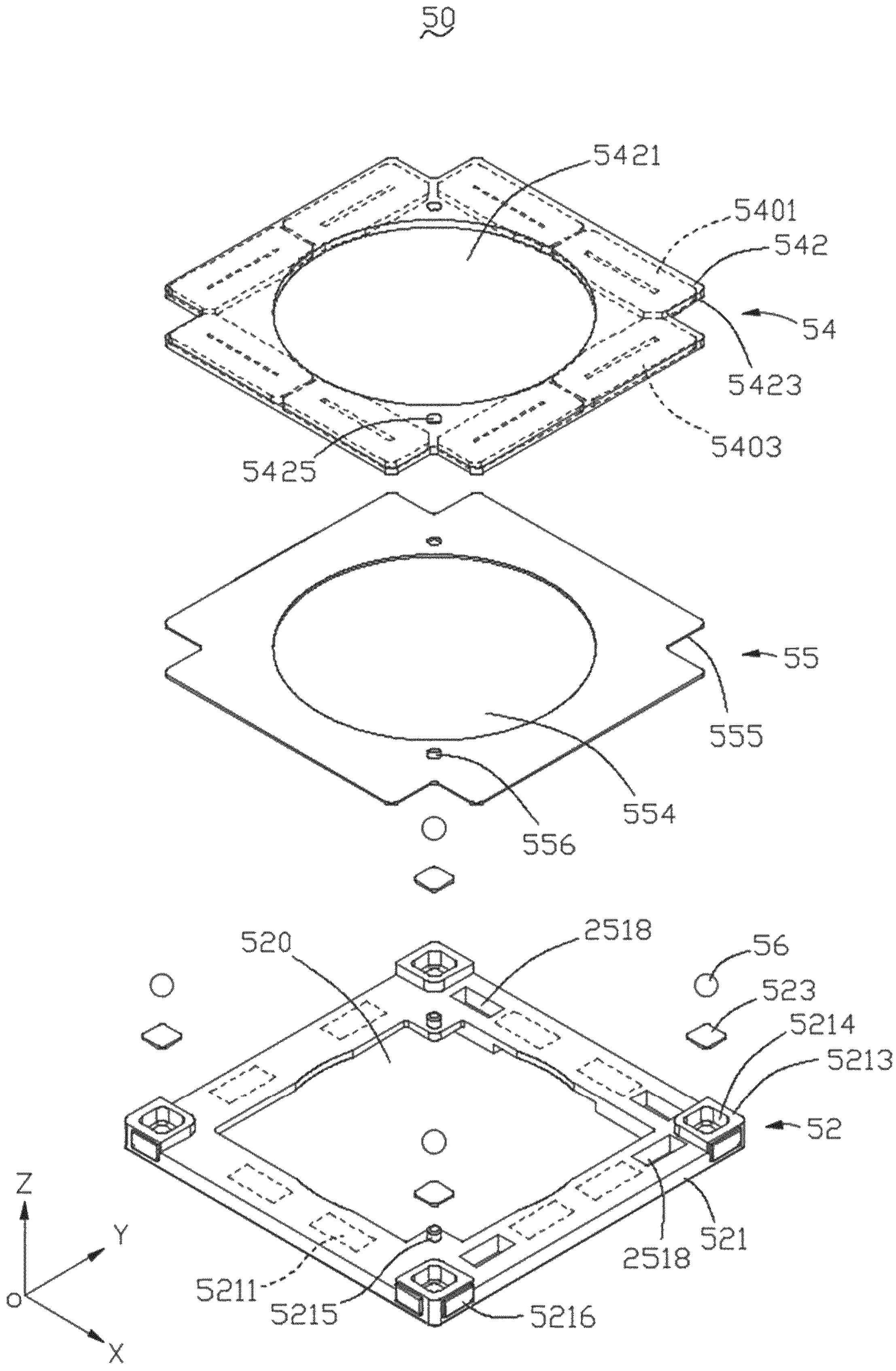
FIG. 8 is an enlarged perspective structural view of an in-body image stabilization (IBIS) mechanism in FIG. 2.
Figure 9:
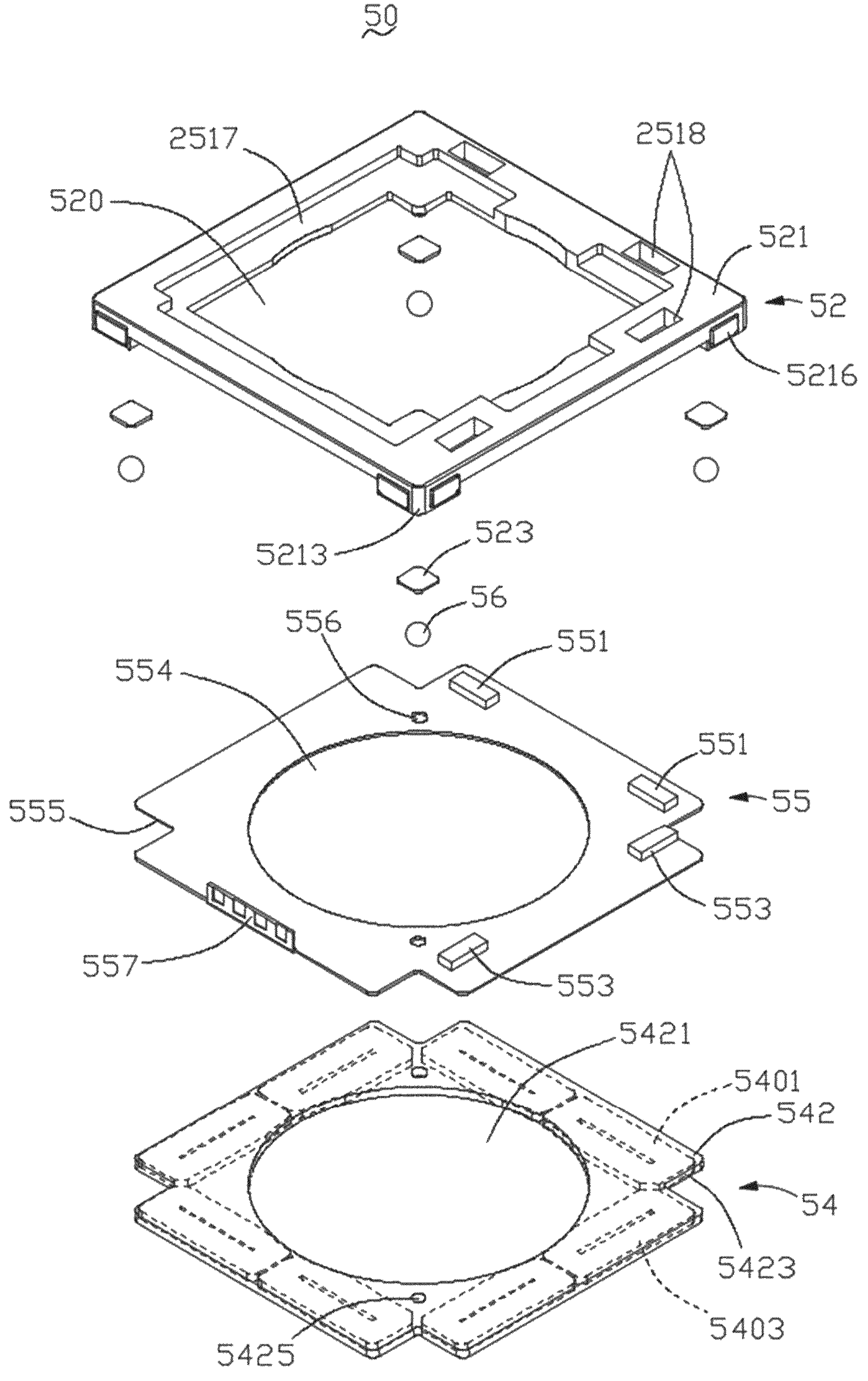
FIG. 9 is a perspective structural view of the IBIS mechanism in FIG. 8, viewed from another direction.
Figure 10:
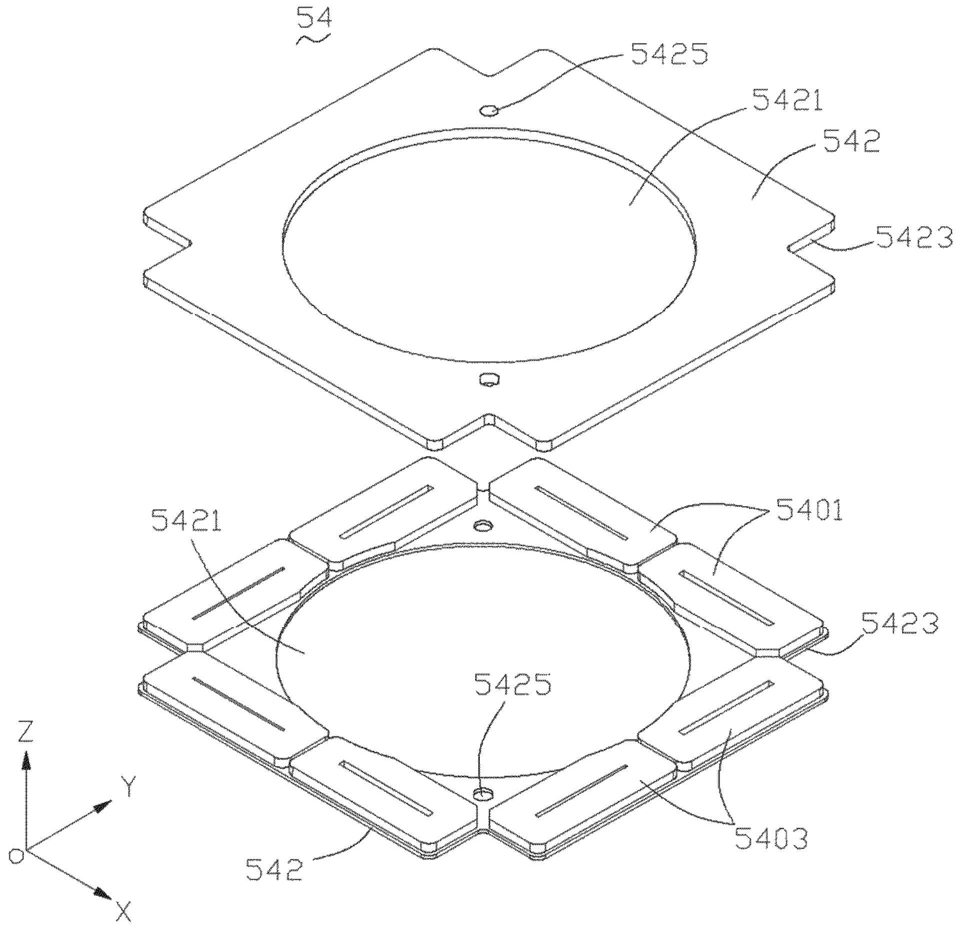
FIG. 10 is a schematic exploded perspective structural view of a coil module in FIG. 8.

Referring to FIGS. 4 to 5 and FIGS. 8 to 10, FIG. 8 is an enlarged perspective structural view of the IBIS mechanism 50 in FIG. 2, FIG. 9 is a perspective structural view of the IBIS mechanism 50 in FIG. 8, viewed from another direction, and FIG. 10 is a schematic exploded perspective structural view of the coil module 54 in FIG. 8. The second base 52 is a hollow plastic frame. A volume of the second base 52 is smaller than a volume of the accommodation space 228 of the first base 22, and thus the second base 52 can be accommodated in the accommodation space 228 and movable in the accommodation space 228. Specifically, the second base 52 defines a receiving hole 520 at the middle of an upper surface of the second base 52, the receiving hole 520 extends through the second base 52 and is used for receiving the photosensitive chip, a driving chip, and the like. In the implementations, the second base 52 includes a base plate 521 that is rectangular, and the receiving hole 520 is defined on an upper surface of the base plate 521 and extends through the base plate 521. The second base 52 is provided with a magnetic conductive member 5211 corresponding to the magnetic assembly 27, and the magnetic conductive member 5211 and the magnetic assembly 27 magnetically attract each other. In the implementations, the base plate 521 is provided with multiple magnetic conductive members 5211, where the multiple magnetic conductive members 5211 are disposed around the receiving hole 520, and each of the magnetic conductive members 5211 is an iron piece, that is, the base plate 521 is embedded with multiple iron pieces that are disposed around the receiving hole 520, and the multiple iron pieces magnetically attract the first magnetic member 271 and the second magnetic member 273.

The second base 52 is connected to the first base 22 through multiple universal balls 56 arranged in a circumferential direction of the coil assembly 26, and the second base 52 is spaced apart from the first base 22, so that the second base 52 can move relative to the first base 22 through the universal balls 56. Specifically, the second base 52 is provided with multiple positioning portions 5213 at one side of the second base 52 facing the first base 22, where the multiple positioning portions 5213 are disposed around the coil assembly 26 and are arranged in at least one circle in the circumferential direction of the coil assembly 26, and the multiple universal balls 56 are rotatably disposed in the multiple positioning portions 5213, respectively. Specifically, each positioning portion 5213 defines a ball groove 5214 on a side surface facing the first base 22, and a depth of the ball groove 5214 is smaller than a diameter of the universal ball 56. The universal ball 56 is accommodated in the ball groove 5214, and some of the universal ball 56 extend out of the ball groove 5214 to abut against the first base 22. In the implementations, the positioning portions 5213 are respectively arranged at four corners of the upper surface of the base plate 521, the positioning portions 5213 are bosses protruding from the base plate 521, and the ball grooves 5214 are defined on upper surfaces of the bosses, respectively.

In other implementations, multiple positioning portions may be arranged on a side surface of the first base 22 facing the second base 52 and arranged in at least one circle in the circumferential direction of the coil assembly 26, the multiple universal balls 56 are rotatably arranged at the multiple positioning portions, respectively, and each universal ball 56 rotatably abuts against the second base 52.

In other implementations, the first base 22 defines multiple first ball grooves on a side surface of the first base 22 facing the second base 52, and the multiple first ball grooves are arranged in at least one circle in a circumferential direction of the coil assembly 26. The second base 52 defines multiple second ball grooves on a side surface of the second base 52 facing the first base 22, the multiple second ball grooves respectively correspond to the multiple first ball grooves, and each of the multiple first ball grooves and a corresponding one of the multiple second ball grooves cooperate to receive one universal ball 56. A diameter of the universal ball 56 is greater than the sum of a depth of the first ball groove and a depth of the second ball groove, so that the first base 22 is spaced apart from the second base 52, which facilitates movement of the second base 52 relative to the first base 22.

In some implementations, a second anti-collision member 523 is disposed at a position where the positioning portion 5213 is in contact with the universal ball 56. In the implementations, in the ball groove 5214 of each positioning portion 5213, one second anti-collision member 523 is disposed, and each second anti-collision member 523 is a hard wear-resistant piece disposed in the ball groove 5214. In some implementations, an inner side surface of the ball groove 5214 of each positioning portion 5213 is embedded with a hard wear-resistant piece.

The base plate 521 is provided with positioning posts 5215 at the upper surface of the base plate 521, and the positioning posts 5215 are disposed around the receiving hole 520 and are used for positioning the coil module 54 to the second base 52. Specifically, the positioning posts 5215 are respectively disposed at two opposite corners of the upper surface of the base plate 521 adjacent to the receiving hole 520, and the positioning post 5215 is not longer than the positioning portion 5213 in the axial direction. The second base 52 is provided with multiple collision portions 5216 at outer peripheral walls of the second base 52, each collision portion 5216 is made of a flexible material, and the collision portions 5216 can prevent the second base 52 from rigidly colliding with the first base 22. In the implementations, two opposite ends of each side wall of the base plate 521 are respectively provided with the collision portions 5216. The base plate 521 defines an avoidance groove 2517 and multiple avoidance holes 2518 on a lower surface of the base plate 521, and the avoidance groove 2517 surrounds the receiving hole 520 and the multiple avoidance holes 2518 are arranged around the receiving hole 520. The avoidance groove 2517 is in communication with the receiving hole 520, and the multiple avoidance holes 2518 are arranged in a circumferential direction of the receiving hole 520.

The coil module 54 includes at least one pair of first coils 5401 each corresponding to one pair of first magnetic members 271, that is, each pair of first coils 5401 correspond to the one pair of the first magnetic members 271. When one pair of first coils 5401 is energized, the second electromagnetic force is generated between the one pair of first coils 5401 and a corresponding pair of first magnetic members 271 to drive the second base 52 and the coil module 54 to move relative to the first base 22 in a first direction. The first direction is perpendicular to the axial direction, that is, the second base 52 and the coil module 54 move in a Y-axis. When a direction of a current input into one pair of first coils 5401 is changed, the second electromagnetic force generated between the one pair of first coils 5401 and a corresponding pair of first magnetic members 271 can change a movement direction of the second base 52. In another example, when one pair of first coils 5401 is energized, a first component of the second electromagnetic force is generated between the one pair of first coils 5401 and a corresponding pair of first magnetic members 271 to drive the second base 52 and the coil module 54 to move relative to the first base 22 in the first direction. The first direction is perpendicular to the axial direction, that is, the second base 52 and the coil module 54 move in the Y-axis. When a direction of a current input into one pair of first coils 5401 is changed, the first component of the second electromagnetic force generated between the one pair of first coils 5401 and a corresponding pair of first magnetic members 271 can change a movement direction of the second base 52.

In the implementations, the coil module 54 includes two pairs of first coils 5401 corresponding to one pair of first magnetic members 271, that is, both the two pairs of first coils 5401 correspond to one pair of first magnetic members 271. When a current input into one pair of the two pairs of first coils 5401 is different from a current input into the other pair of the two pairs of first coils 5401, a component of the second electromagnetic force generated between one pair of the two pairs of first coils 5401 and the one pair of first magnetic members 271 is different from another component of the second electromagnetic force generated between the other pair of the two pairs of first coils 5401 and the one pair of first magnetic members 271, so that different driving forces are generated between the first coils 5401 and the first magnetic members 271 to form a moment, to drive the second base 52 and the coil module 54 to rotate relative to the first base 22 about the axis parallel to the axial direction. When a current input into one pair of the two pairs of first coils 5401 is the same as a current input into the other pair of the two pairs of first coils 5401, a component of the second electromagnetic force generated between the two pairs of first coils 5401 and the one pair of first magnetic members 271 drives the second base 52 and the coil module 54 to move relative to the first base 22 in a direction perpendicular to the axial direction (i.e., the Y-axis). When directions of the currents input into the two pairs of first coils 5401 are changed, the second electromagnetic force generated between the two pairs of first coils 5401 and the one pair of first magnetic members 271 can change the movement direction of the second base 52.

In some implementations, the coil module 54 further includes at least one pair of second coils 5403 each corresponding to one pair of second magnetic members 273, that is, each pair of second coils 5403 correspond to the one pair of second magnetic members 273. When one pair of second coils 5403 is energized, and the second electromagnetic force is generated between the one pair of second coils 5403 and a corresponding pair of second magnetic members 273 to drive the second base 52 and the coil module 54 to move relative to the first base 22 in a second direction, and the second direction is perpendicular to the first direction and the axial direction. That is, the second base 52 and the coil module 54 move along an X-axis. When a direction of a current input into the one pair of second coils 5403 is changed, the second electromagnetic force generated between the one pair of second coils 5403 and a corresponding pair of second magnetic members 273 can change the movement direction of the second base 52. In another implementation, when one pair of second coils 5403 is energized, and a second component of the second electromagnetic force is generated between the one pair of second coils 5403 and a corresponding pair of second magnetic members 273 to drive the second base 52 and the coil module 54 to move relative to the first base 22 in the second direction, and the second direction is perpendicular to the first direction and the axial direction. That is, the second base 52 and the coil module 54 move along the X-axis. When a direction of a current input into the one pair of second coils 5403 is changed, the second component of the second electromagnetic force generated between the one pair of second coils 5403 and a corresponding pair of second magnetic members 273 can change the movement direction of the second base 52.

In the implementations, the coil module 54 includes two pairs of second coils 5403 each corresponding to one pair of second magnetic members 273, that is, both the two pairs of second coils 5403 correspond to the one pair of second magnetic members 273. When a current input into one pair of the two pairs of second coils 5403 is different from a current input into the other pair of the two pairs of second coils 5403, a component of the second electromagnetic force generated between the one pair of the two pairs of second coils 5403 and the one pair of second magnetic members 273 is different from another component of the second electromagnetic force generated between the other pair of the two pairs of second coils 5403 and the one pair of second magnetic members 273, and thus different driving forces generated between the two pairs of second coils 5403 and the one pair of second magnetic members 273 form a moment to drive the second base 52 and the coil module 54 to rotate relative to the first base 22 about an axis parallel to the axial direction. When a current input into one pair of the two pairs of second coils 5403 is the same as a current input into the other pair of the two pairs of second coils 5403, a component of the second electromagnetic force generated between the two pairs of second coils 5403 and the one pair of second magnetic members 273 drives the second base 52 and the coil module 54 to move relative to the first base 220 in a direction perpendicular to the axial direction (i.e., the X-axis). When directions of the currents input into the two pairs of second coils 5403 are changed, the second electromagnetic force generated between the two pairs of second coils 5403 and the one pair of second magnetic members 273 drives to change the movement direction of the second base 52.

In some implementations, the at least one pair of first coils 5401 and the at least one pair of second coils 5403 are configured to be energized, so that a component of the second electromagnetic force generated between the at least one pair of first coils 5401 and the at least one pair of first magnetic members 271 is different from another component of the second electromagnetic force generated between the at least one pair of second coils 5403 and the at least one pair of second magnetic members 273, and the second base 52 and the coil module 54 are driven by the second electromagnetic force to rotate relative to the first base 220 about the axis parallel to the axial direction.

As illustrated in FIG. 10, in the implementations, the coil module 54 includes one pair of clamping plates 542, and two pairs of first coils 5401 and two pairs of second coils 5403 clamped between the one pair of clamping plates 542, where the two pairs of first coils 5401 and the two pairs of second coils 5403 surround to form a rectangular structure. Each clamping plate 542 defines a through hole 5421 at the middle of each clamping plate 542, and the two pairs of first coils 5401 and the two pairs of second coils 5403 are arranged around the through hole 5421. Each clamping plate 542 defines multiple positioning openings 5423 at an outer periphery of each clamping plate 542, and the positioning openings 5423 are used for positioning the coil module 54 to the second base 52. In some implementations, each clamping plate 542 defines at least one pair of positioning holes 5425 around the through hole 5421. Specifically, each clamping plate 542 is a rectangular plate, the positioning openings 5423 are respectively arranged at four corners of the rectangular plate, the two pairs of first coils 5401 are respectively located at two opposite sides of the rectangular plate, and the two pairs of second coils 5403 are respectively located at the other two opposite sides of the rectangular plate.

Both the two pairs of first coils 5401 correspond to the one pair of first magnetic members 271, and both the two pairs of second coils 5403 correspond to the one pair of second magnetic members 273. When the first coils 5401 and/or the second coils 5403 are energized, a component of the second electromagnetic force generated between one pair of the two pairs of first coils 5401 and the one pair of first magnetic members 271 is different from another component of the second electromagnetic force generated between the other pair of the two pairs of first coils 5401 and the one pair of first magnetic members 271, and/or a component of the second electromagnetic force generated between one pair of the two pairs of second coils 5403 and the one pair of second magnetic members 273 is different from another component of the second electromagnetic force generated between the other pair of the two pairs of second coils 5403 and the one pair of second magnetic members 273, so that the second base 52 and the coil module 54 can rotate relative to the first base 22 about the axis parallel to the axial direction. That is, a component of the second electromagnetic force generated between the first coils 5401 and the first magnetic members 271 and a component of the second electromagnetic force generated between the second coils 5403 and the second magnetic members 273 cooperate to drive the second base 52 and the coil module 54 to move in the direction perpendicular to the axial direction and/or to rotate about the axis parallel to the axial direction (i.e., move along the XOY plane and/or rotate about an axis parallel to the Z-axis).

The IBIS mechanism 50 further includes a flexible circuit board 55 connected to the coil module 54. The flexible circuit board 55 is provided with a first magnetic induction driving element 551 corresponding to the first magnetic members 271 and a second magnetic induction driving element 553 corresponding to the second magnetic members 273. In some implementations, an orthogonal projection of the first magnetic induction driving element 551 on the magnetic assembly 27 falls within the first magnetic member 271, and an orthogonal projection of the second magnetic induction driving element 553 on the magnetic assembly 27 falls within the second magnetic member 273. In the implementations, the flexible circuit board 55 is provided with two first magnetic induction driving elements 551 that are spaced apart from each other and correspond to the first magnetic members 271. When the photosensitive chip attached to the IBIS mechanism 50 is moved, a variation of a magnetic flux generated between the first magnetic induction driving elements 551 and the first magnetic members 271 is calculated, thereby controlling both movement of the IBIS mechanism 50 in the Y-axis and rotation of the IBIS mechanism 50 about the axis parallel to the Z-axis. The flexible circuit board 55 is provided with two second magnetic induction driving elements 553 that are spaced apart from each other and correspond to the second magnetic members 273. When the photosensitive chip attached to the IBIS mechanism 50 is moved, a variation of a magnetic flux generated between the second magnetic induction driving elements 553 and the second magnetic members 273 is calculated, thereby controlling both movement of the IBIS mechanism 50 in the X-axis and rotation of the IBIS mechanism 50 about the axis parallel to the Z-axis. The flexible circuit board 55 defines a through hole 554 at the middle of the flexible circuit board 55 and multiple positioning openings 555 at a periphery of the flexible circuit board 55, and the positioning openings 555 are used for positioning the flexible circuit board 55 to the second base 52. The flexible circuit board 55 defines two opposite positioning holes 556 around the through hole 554, and is provided with a connection pin 557 at one side of the flexible circuit board 55. Specifically, the flexible circuit board 55 is a rectangular board, the positioning openings 555 are respectively defined at four corners of the rectangular board, and the two first magnetic induction driving elements 551 are arranged at one side of the rectangular board, and the two second magnetic induction driving elements 553 are arranged at another side of the rectangular board adjacent to the one side of the rectangular board.

Figure 11:
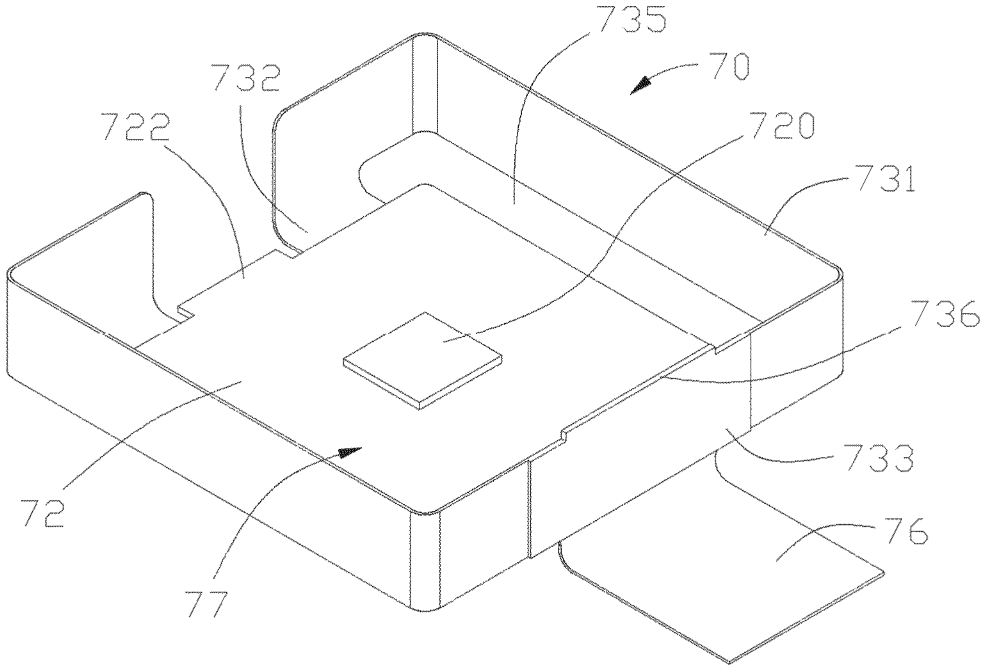
FIG. 11 is an enlarged perspective view of a circuit board module in FIG. 4.
Figure 12:
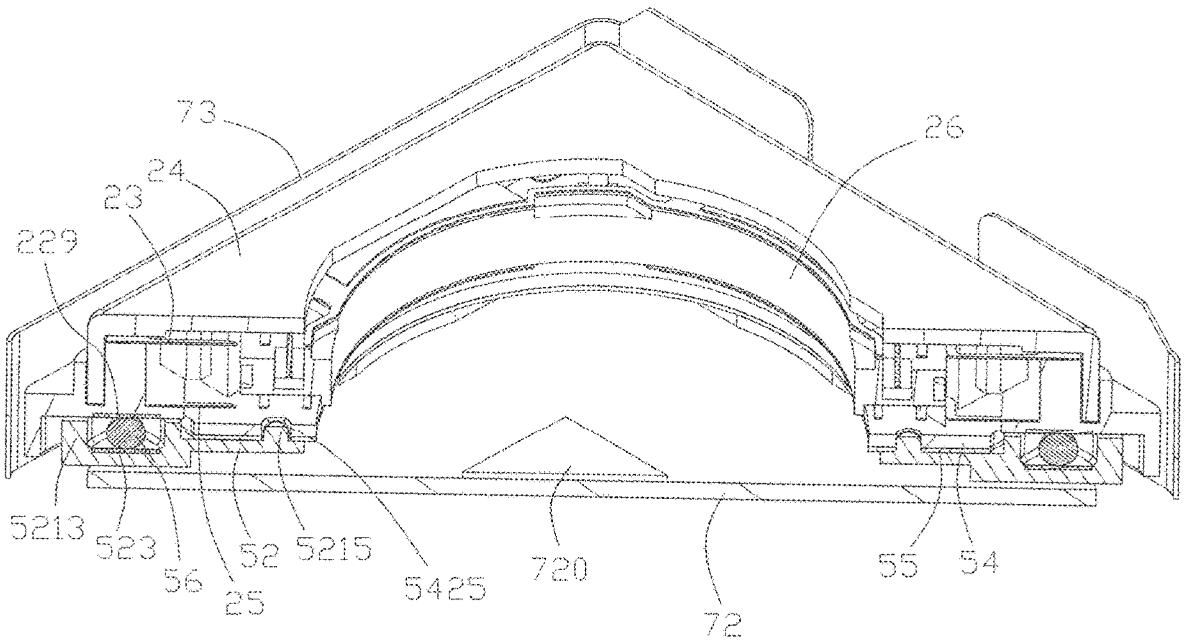
FIG. 12 is a perspective cross-sectional view of the voice coil motor in FIG. 1, viewed from a direction.
Figure 13:
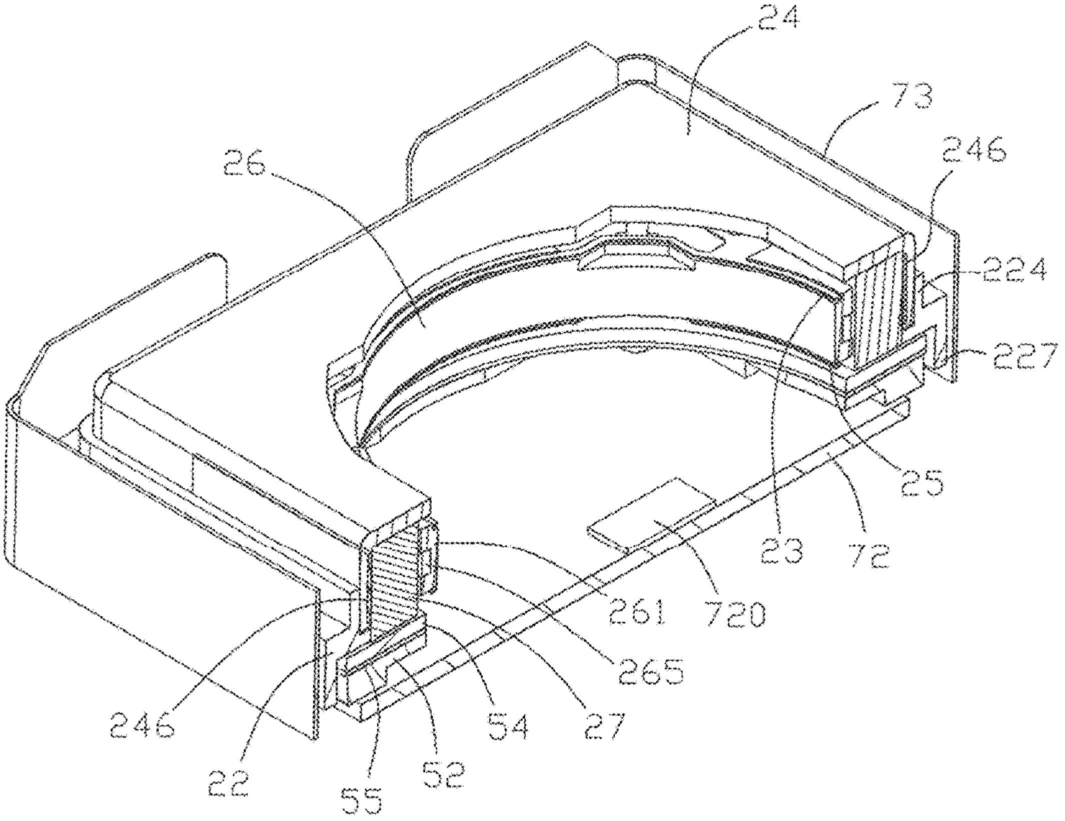
FIG. 13 is a perspective cross-sectional view of the voice coil motor in FIG. 1, viewed from another direction.
Figure 14:
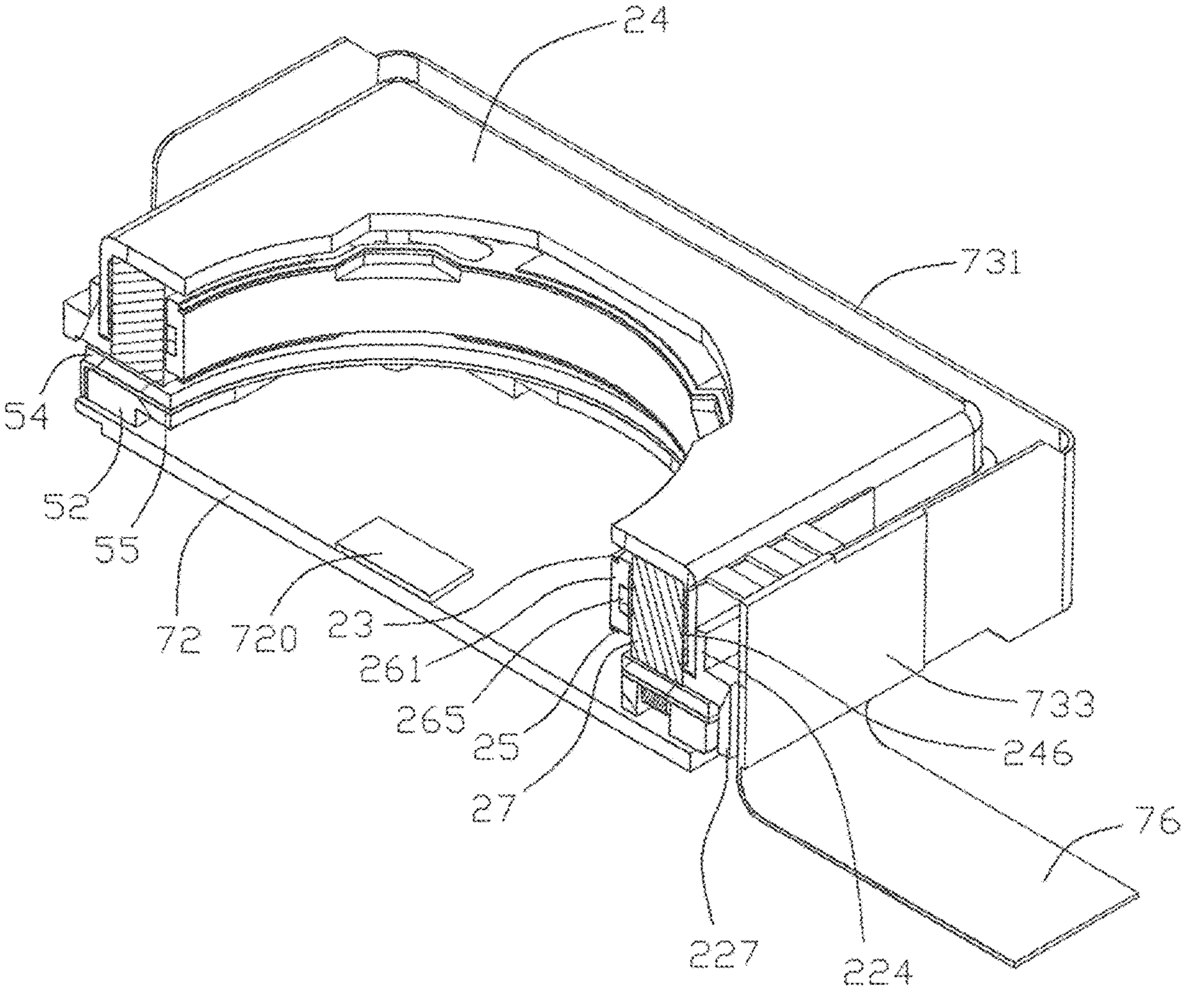
FIG. 14 is a perspective cross-sectional view of the voice coil motor in FIG. 1, viewed from another direction.

Referring to FIG. 4, FIG. 5, and FIG. 11, FIG. 11 is an enlarged perspective view of the circuit board module 70 in FIG. 4. The voice coil motor 100 further includes a circuit board module 70 disposed at one side of the second base 52 away from the first base 22, and the circuit board module 70 is electrically connected to the coil assembly 26 and the coil module 54. Specifically, the circuit board module 70 is electrically connected to the coil assembly 26 through the metal wire 248 of the cover 24, and is electrically connected to the coil module 54 through the flexible circuit board 55. Electronic elements such as a photosensitive chip 720 are disposed on the circuit board module 70, and the circuit board module 70 is fixedly connected to the second base 52 and can be moved relative to the first base 22 along with the second base 52, thereby achieving displacement of the photosensitive chip 720 to perform image-stabilization compensation.

In the implementations, the circuit board module 70 includes a bottom plate 72 corresponding to a lower surface of the second base 52, and a conductive member 73 connected to the bottom plate 72 and surrounding the bottom plate 72, and an extension plate 76 connected to the conductive member 73. The bottom plate 72 is electrically connected to the coil module 54, the conductive member 73 is electrically connected to the coil assembly 26, and the extension plate 76 is configured to be electrically connected to an external connector. An avoidance groove 735 is defined between part of the conductive member 73 and the bottom plate 72. Specifically, the conductive member 73 includes two flexible side plates 731 connected to the bottom plate 72 and surrounding two opposite sides of the first base 22, and a connection plate 733 connected between the two flexible side plates 731. The bottom plate 72 is fixedly connected to the lower surface of the second base 52, and the photosensitive chip 720 is disposed on an upper surface of the bottom plate 72. In a case that the bottom plate 72 is connected to the second base 52, the photosensitive chip 720 faces the receiving hole 520 of the second base 52. In the implementations, the bottom plate 72 is a rectangular flexible circuit board, and is provided with a first connection portion 722 extending outwards from the middle of one side of the bottom plate 72. The first connection portion 722 is electrically connected to the connection pin 557 of the flexible circuit board 55. In some implementations, the first connection portion 722 and the connection pin 557 are connected by soldering. In other implementations, the bottom plate 72 may also be a circular circuit board, a polygonal circuit board, or an oval circuit board. The bottom plate 72 may also be a printed circuit board (PCB) of various shapes.

One end of each of the two flexible side plates 731 is connected to one side of the bottom plate 72 on which the first connection portion 722 is provided, the other end of each of the two flexible side plates 731 extends along an edge of the bottom plate 72 to be connected to the connection plate 733, and the connection plate 733 is disposed at one side of the bottom plate 72 away from the first connection portion 722. The bottom plate 72 and the two flexible side plates 731 surround a space to define an avoidance space 77. The first base 22 is accommodated in the avoidance space 77. Specifically, each flexible side plate 731 is U-shaped, one end of each of the two flexible side plates 731 is connected to the bottom plate 72 through a bent portion 732, and the two bent portions 732 are located at two opposite ends of the first connection portion 722. The other end of one of the flexible side plates 731 away from the first connection portion 722 is connected to the other end of the other one of the flexible side plates 731 away from the first connection portion 722 through the connection plate 733. The connection plate 733 is provided with a second connection portion 736 at one side of the connection plate 733 away from the bottom plate 72, and the second connection portion 736 is electrically connected to the coil assembly 26.

Specifically, the second connection portion 736 is electrically connected to the metal wire 248 of the cover 24. In some implementations, the second connection portion 736 is connected to the metal wire 248 through soldering. The extension plate 76 is connected to one side of the connection plate 733 away from the second connection portion 736. Each of the flexible side plates 731 and the bottom plate 72 define the avoidance groove 735 therebetween, and a periphery of the bottom of the first base 22 extends through the avoidance groove 735 to be connected to an external structure. With the aid of the avoidance groove 735, a small portion of the conductive member 73 is connected to the bottom plate 72, thereby reducing resistance of the conductive member 73 to movement of the bottom plate 72 during movement of the second base 52. The flexible side plate 731, the connection plate 733, and the extension plate 76 are all flexible circuit boards.

Referring to FIGS. 1 to 5 and FIGS. 12 to 14, during assembly of the voice coil motor 100, the autofocus mechanism 20 is first assembled. Specifically, one pair of first magnetic members 271 are respectively secured between the fixing members 245 of one pair of the side plates 242 of the cover 24, each first magnetic member 271 attracts the magnetic conductive member 246 in a corresponding side plate 242 to increase a magnetic field intensity of the first magnetic member 271, and the first magnetic member 271 is fixed to the cover 24 by adhesive dispensing. One pair of second magnetic members 273 are respectively secured between the fixing members 245 of the other pair of side plates 242 of the cover 24, and each second magnetic member 273 attracts the magnetic conductive member 246 in a corresponding side plate 242 to increase a magnetic field intensity of the second magnetic member 273, and the second magnetic member 273 is fixed to the cover 24 by adhesive dispensing. The first connection ring 231 of the first resilient member 23 is fixedly connected to the positioning groove 2611 of the carrier 261, and the multiple positioning pieces 2333 of the first resilient member 23 are respectively connected to the connection portions 247 of the cover 24 by soldering. In this case, the coil assembly 26 can conduct a positive terminal and a negative terminal on the cover 24 through the first resilient member 23, so that the first resilient member 23 and the coil 265 can conduct positive and negative currents through soldering a loop. The coil assembly 26 is accommodated in the accommodation space 243 of the cover 24, the multiple damping pins 2482 are slidably inserted into the multiple damping holes 2616 of the carrier 261, respectively, and the first resilient member 23 is resiliently connected between the coil assembly 26 and the cover 24. The second connection ring 251 of the second resilient member 25 is fixedly connected to the positioning ring 2617 of the carrier 261. The coil assembly 26 is disposed on the top of the first base 22, so that the multiple positioning posts 223 of the first base 22 are respectively inserted into the multiple positioning holes 2535 of the second resilient member 25, the support ring 252 of the first base 22 is snapped into the positioning groove 225 of the first base 22 and fixed by adhesive dispensing. The side plate 242 of the cover 24 is snapped into the positioning groove 225 of the first base 22, and the second resilient member 25 is resiliently connected between the coil assembly 26 and the first base 22. In this case, the coil assembly 26 is axially movably disposed in a space surrounded by the first base 22 and the cover 24, and the first resilient member 23 and the second resilient member 25 are configured to drive the coil assembly 26 to reset.

The flexible circuit board 55 is attached to a lower surface of the coil module 54, so that the flexible circuit board 55 is electrically connected to the first coil 5401 and the second coil 5403 of the coil module 54 through soldering. The through hole 554 of the flexible circuit board 55 faces the through hole 5421 of the coil module 54, and the multiple positioning openings 555 of the flexible circuit board 55 respectively face the multiple positioning openings 5423 of the coil module 54, and the two positioning holes 556 of the flexible circuit board 55 respectively face the two positioning holes 5425 of the coil module 54. One side of the flexible circuit board 55 away from the coil module 54 is disposed on the top of the second base 52, so that the positioning portions 5213 of the second base 52 are respectively snapped into the positioning openings 555 of the flexible circuit board 55 and the positioning openings 5423 of the coil modules 54, and the two positioning posts 5215 of the second base 52 are inserted into the two positioning holes 556 of the flexible circuit board 55 and the two positioning holes 5425 of the coil module 54. The flexible circuit board 55 and the coil module 54 are fixed to the second base 52 by adhesive dispensing, the first magnetic induction driving element 551 and the second magnetic induction driving element 553 of the flexible circuit board 55 are respectively accommodated in the avoidance holes 2518 of the second base 52. The circuit board module 70 is connected to the bottom of the second base 52. Specifically, the bottom plate 72 is snapped into the avoidance groove 2517 of the second base 52 and is fixed by adhesive dispensing, so that the second base 52 is accommodated in the avoidance space 77 of the circuit board module 70, and the first connection portion 722 is connected to the connection pin 557 by soldering. The multiple second anti-collision members 523 are respectively positioned in the multiple ball grooves 5214 of the second base 52, the multiple universal balls 56 are respectively disposed in the multiple ball grooves 5214 of the second base 52, and part of each universal ball 56 is exposed outside of a corresponding ball groove 5214. The second base 52 is accommodated in the accommodation space 228 of the first base 22, so that the magnetic conductive members 5211 of the second base 52 magnetically attract the first magnetic members 271 and the second magnetic members 273, respectively, and the multiple universal balls 56 and the second base 52 rotatably abut against the multiple first anti-collision members 229 of the first base 22, respectively, and thus the universal balls 56 are prevented from colliding the first base 22 and the second base 52, thereby avoiding formation of pits in the first base 22 and the second base 52 to avoid abnormality. The autofocus mechanism 20 is accommodated in the avoidance space 77 of the circuit board module 70, and the second connection portion 736 is connected to the metal wire 248 of the cover 24 by soldering. In this case, the second base 52 is spaced apart from the first base 22 and the second base 52 is connected to the first base 22 through the universal balls 56, so that a degree of freedom of the second base 52 in the Z-axis direction is limited relative to the first base 22, and consequently the second base 52 can only slide along the XOY plane and/or rotate in the accommodation space 228 relative to the first base 22 about an axis parallel to the Z-axis direction. The collision portion 5216 of the second base 52 is limited by an inner side surface of the limit ring 227, so that the universal balls 56 can be limited, the second base 52 can be spaced apart from the first base 22, thereby achieving a reduction in a friction force between the second base 52 and the first base 22. The second base 52 moves in a space surrounded by the limit ring 227.

When the coil 265 is energized, the first electromagnetic force is generated between the coil 265 of the coil assembly 26 and the magnetic assembly 27 of the cover 24. The first electromagnetic force pushes the coil assembly 26 to move in the axial direction, that is, the first electromagnetic force pushes the coil assembly 26 to move up and down in the space surrounded by the first base 22 and the cover 24 in the axial direction, so that the lens attached to the carrier 261 achieves an autofocus function. During movement of the coil assembly 26, the connection branch 2331 of the first resilient member 23 and the connection branch 2531 of the second resilient member 25 are resiliently deformed, and after the first electromagnetic force is removed, the connection branch 2331 of the first resilient member 23 and the connection branch 2531 of the second resilient member 25 can recover to drive the coil assembly 26 to reset.

When the coil module 54 is energized, the first coil 5401 and the second coil 5403 are energized so that the second electromagnetic force is generated between the first coil 5401, the second coil 5403, and the magnetic assembly 27 of the cover 24, the second electromagnetic force pushes the second base 52 and the coil module 54 to move relative to the first base 22, so that the photosensitive chip 720 located at the second base 52 moves along the XOY plane and/or rotates axially along with the second base 52 in the accommodation space 228 of the first base 22 to compensate lens shaking, thereby achieving the IBIS function. During movement of the second base 52 relative to the first base 22, the magnetic conductive member 5211 of the second base 52 is in magnetic attraction with the magnetic assembly 27, and the multiple of the universal balls 56 are rotatably sandwiched between the first base 22 and the second base 52, respectively. The first magnetic induction driving element 551 cooperates with the first magnetic member 271, and the second magnetic induction driving element 553 cooperates with the second magnetic member 273, so that an actual trajectory of movement of the second base 52 relative to the first base 22 can be fed back, and a magnitude and/or direction of a current of the first coil 5401 and/or the second coil 5403 can be adjusted, thereby improving accuracy of trajectory of movement of the second base 52, improving accuracy of trajectory of movement of the photosensitive chip 720 attached to the second base 52, and enhancing an image-stabilization performance of the IBIS mechanism 50. That is, the first magnetic induction driving element 551 and the second magnetic induction driving element 553 are used for computing a variation of a magnetic flux generated by the first magnetic member 271 and the second magnetic member 273 during movement of the photosensitive chip 720 attached to the IBIS mechanism 50, so that both movement of the IBIS mechanism 50 along the XOY plane and rotation of the IBIS mechanism 50 about the axis parallel to the Z-axis can be controlled. Because the coil assembly 26 is connected to the bottom plate 72 fixed to the second base 52 through the flexible side plate 731 and the connection plate 733, less reaction force is caused, and movement of the coil assembly 26 and the second base 52 is easily reset.

The second base 52 is space apart from and connected to the first base 22 by magnetic forces, the universal balls 56 are disposed between the second base 52 and the first base 22, and thus low friction between the second base 52 and the first base 22 can be achieved. Because the second base 52 is in magnetic attraction with the magnetic assembly 27, stability of connection between the second base 52 and the first base 22 can be improved.

The coil assembly 26 of the voice coil motor 100 in the disclosure is connected between the first base 22 and the cover 24 through the first resilient member 23 and the second resilient member 25, and the first electromagnetic force can be generated through cooperation of the coil 265 of the coil assembly 26 and the magnetic assembly 27 to drive the coil assembly 26 to move in the axial direction, thereby achieving an autofocus function. The second base 52 is connected to one side of the first base 22 away from the cover 24 through the multiple universal balls 56, and the second electromagnetic force is generated through cooperation between the coil module 54 and the magnetic assembly 27 to drive the second base 52 to move relative to the first base 22, thereby driving the bottom plate 72 where the photosensitive chip 720 is located to move, and realizing the IBIS. The autofocus mechanism 20 is independent of the IBIS mechanism 50, the coil assembly 26 connected to the first resilient member 23 and the second resilient member 25 only needs to be attached to the lens, and the IBIS mechanism 50 is connected to the first base 22 through cooperation of the magnetic conductive member 5211 and the magnetic assembly 27, thereby achieving a reduction in the weight of the autofocus mechanism 20 where the lens is located, and enhancing the reliability of the voice coil motor 100.

Figure 15:
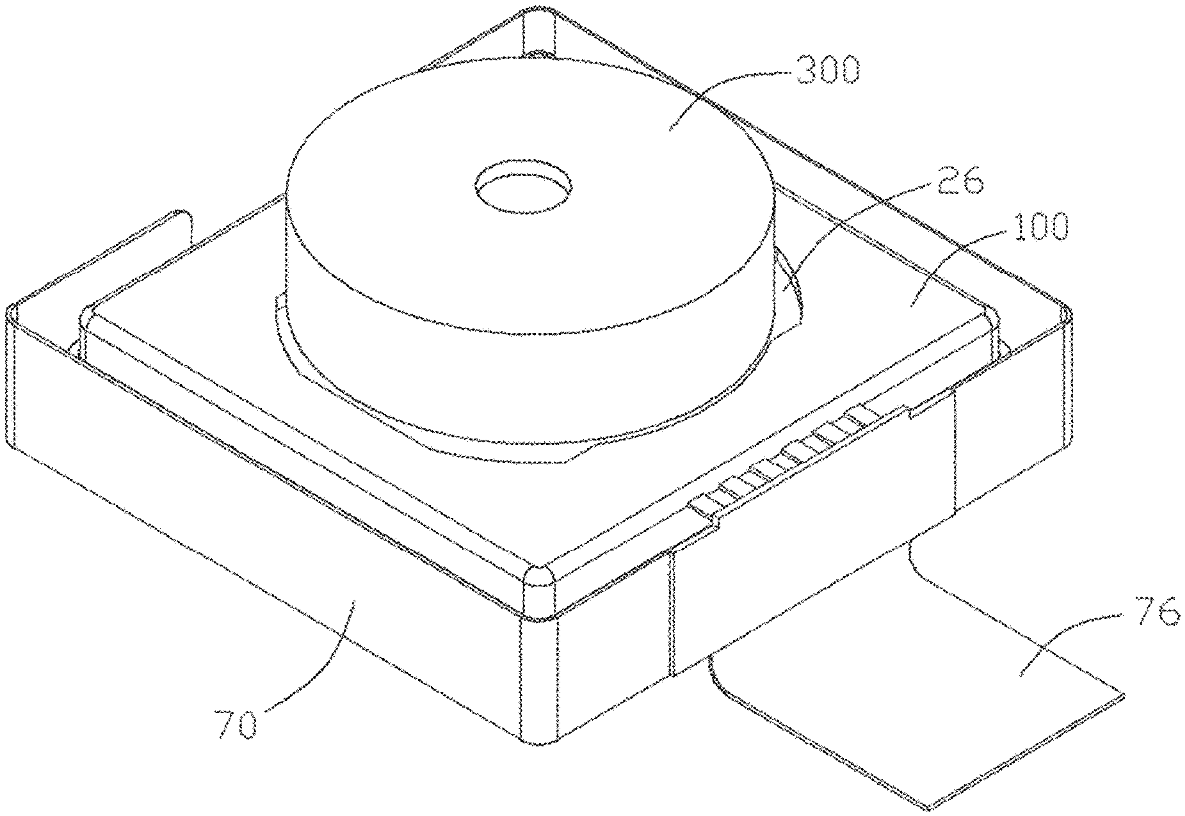
FIG. 15 is a schematic perspective structural view of a camera provided in an implementation of the disclosure.

Referring to FIG. 15, FIG. 15 is a schematic perspective structural view of a camera provided in an implementation of the disclosure. The camera includes the voice coil motor 100, a lens module 300, and the photosensitive chip 720 disposed at the voice coil motor 100. The lens module 300 is connected to the coil assembly 26 of the voice coil motor 100, and the voice coil motor 100 is configured to drive the coil assembly 26 to move so that the lens module 300 is driven to move under movement of the coil assembly 26. The voice coil motor 100 is configured to drive the photosensitive chip 720 to move relative to the lens module 300. Specifically, a rear end of the lens module 300 extends through the through hole 244 of the cover 24 and is connected to the mounting hole 2610 of the carrier 261. Specifically, the rear end of the lens module 300 is snapped into the clamp groove 2613 of the carrier 261. A front end of the lens module 300 extends through the through hole 244 of the cover 24 and is exposed to the outside of the cover 24. During usage of the camera, the coil assembly 26 is energized so that the first electromagnetic force is generated between the coil assembly 26 and the magnetic assembly 27, and the first electromagnetic force drives the coil assembly 26 to move axially to drive the lens module 300 to move together with the coil assembly 26, thereby achieving an autofocus function. The coil module 54 is energized so that the second electromagnetic force is generated between the coil module 54 and the magnetic assembly 27, the second electromagnetic force drives the second base 52, the coil module 54 connected to the second base 52, the flexible circuit board 55, and the bottom plate 72 to move along the XOY plane and/or to rotate about the axial direction, so that the photosensitive chip 720 attached to the bottom plate 72 can be driven to move along the XOY plane and/or to rotate axially to compensate lens shaking, thereby achieving the IBIS function.

Figure 16:
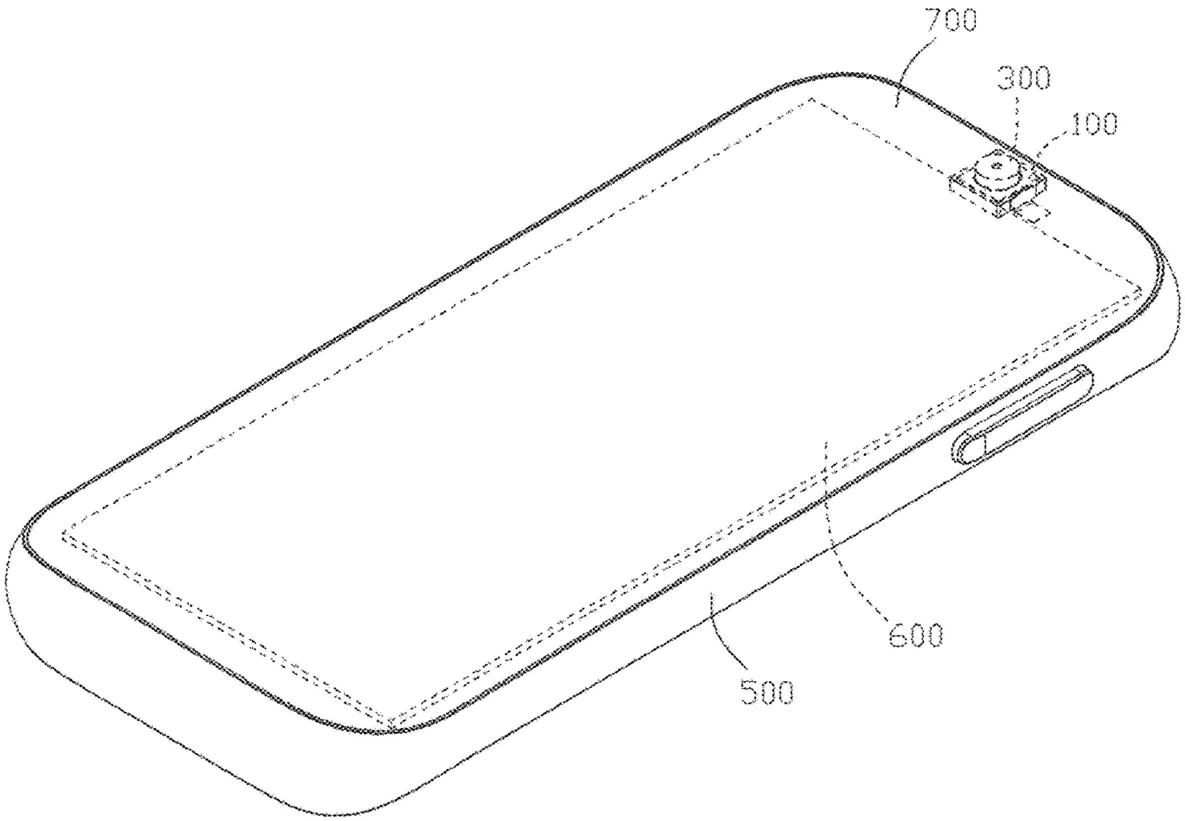
FIG. 16 is a schematic perspective structural view of an electronic device provided in an implementation of the disclosure.
Figure 17:
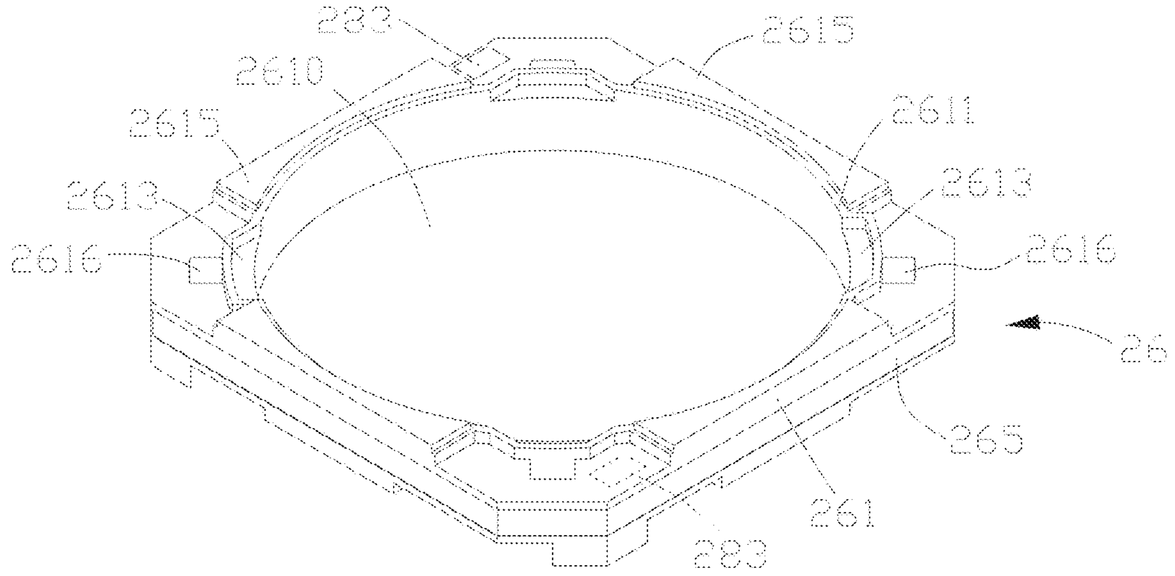
FIG. 17 is a schematic perspective structural view of a coil assembly provided in an implementation of the disclosure, viewed from a direction.
Figure 18:
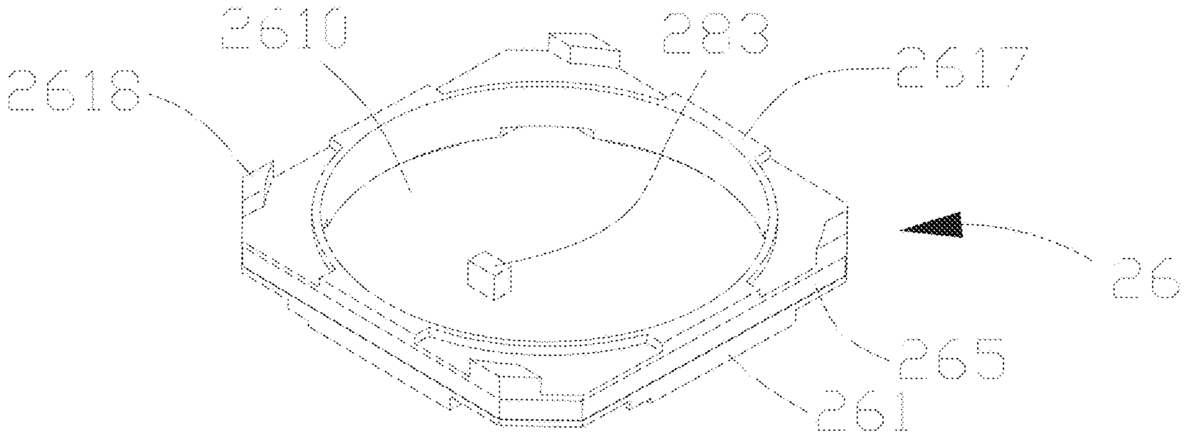
FIG. 18 is a schematic perspective structural view of the coil assembly in FIG. 17, viewed from another direction.

Referring to FIG. 16, FIG. 16 is a schematic perspective structural view of an electronic device provided in an implementation of the disclosure. The electronic device includes a housing 500, a main board 600 disposed inside the housing 500, a display screen 700 disposed on an upper surface of the housing 500, and a camera. The camera is disposed inside the housing 500. The camera and the display screen 700 are electrically connected to the main board 600, respectively. In the implementations, the electronic device is a mobile phone, and the lens module 300 is a front camera of the mobile phone. In other implementations, the lens module 300 may also be a back camera.

In other implementations, the electronic device may also be, but is not limited to, any electronic device that needs to be provided with a camera, such as a tablet computer, a display screen, a smart television, an electronic watch, and a smart bracelet.

The foregoing are implementations of the disclosure. It should be noted that, a person of ordinary skill in the art may further make improvements and modifications without departing from the principle of the implementations of the disclosure, and these improvements and modifications shall also belong to the scope of protection of the disclosure.

What is claimed is:

1. A voice coil motor, comprising:

an autofocus mechanism and an in-body image stabilization (IBIS) mechanism;

wherein the autofocus mechanism comprises a first base, a cover arranged on the first base, a coil assembly disposed between the first base and the cover, and a magnetic assembly arranged on the cover and around the coil assembly;

wherein the IBIS mechanism comprises a second base disposed at one side of the first base away from the cover and a coil module arranged on the second base; when the coil assembly is energized, a first electromagnetic force is generated between the coil assembly and the magnetic assembly to drive the coil assembly to move in an axial direction, wherein the axial direction is a direction parallel to a center axis of the coil assembly; and wherein when the coil module is energized, a second electromagnetic force is generated between the coil module and the magnetic assembly to drive the second base and the coil module to move relative to the first base;

wherein the second base is provided with a magnetic conductive member corresponding to the magnetic assembly, the magnetic conductive member and the magnetic assembly are configured to magnetically attract each other, the second base is connected to the first base through a plurality of universal balls, and the second base is spaced apart from the first base.

2. The voice coil motor of claim 1, wherein the second electromagnetic force between the coil module and the magnetic assembly is configured to:

drive the second base and the coil module to move relative to the first base along a plane perpendicular to the axial direction; or drive the second base and the coil module to rotate relative to the first base about an axis parallel to the axial direction.

3. The voice coil motor of claim 2, wherein the magnetic assembly comprises at least one pair of first magnetic members, and the coil module comprises at least one pair of first coils corresponding to the at least one pair of first magnetic members, wherein when the at least one pair of first coils is energized, a first component of the second electromagnetic force is generated between the at least one pair of first coils and the at least one pair of first magnetic members to drive the second base and the coil module to move relative to the first base in a first direction, and the first direction is perpendicular to the axial direction.

4. The voice coil motor of claim 3, wherein the magnetic assembly comprises at least one pair of second magnetic members, and the coil module comprises at least one pair of second coils corresponding to the at least one pair of second magnetic members, wherein when the at least one pair of second coils is energized, and a second component of the second electromagnetic force is generated between the at least one pair of second coils and the at least one pair of second magnetic members to drive the second base and the coil module to move relative to the first base in a second direction, and the second direction is perpendicular to the first direction and the axial direction.

5. The voice coil motor of claim 4, wherein the at least one pair of first coils and the at least one pair of second coils are configured to be energized, so that a component of the second electromagnetic force generated between the at least one pair of first coils and the at least one pair of first magnetic members is different from another component of the second electromagnetic force generated between the at least one pair of second coils and the at least one pair of second magnetic members, and the second base and the coil module are driven by the second electromagnetic force to rotate relative to the first base about the axis parallel to the axial direction.

6. The voice coil motor of claim 4, wherein the IBIS mechanism further comprises a flexible circuit board electrically connected to the coil module, the flexible circuit board is provided with a first magnetic induction driving element corresponding to the first magnetic member and a second magnetic induction driving element corresponding to the second magnetic member, wherein an orthogonal projection of the first magnetic induction driving element on the magnetic assembly falls within the first magnetic member, and an orthogonal projection of the second magnetic induction driving element on the magnetic assembly falls within the second magnetic member.

7. The voice coil motor of claim 1, wherein the second base is provided with a plurality of positioning portions around the coil assembly at one side of the second base facing the first base, the plurality of positioning portions are arranged in at least one circle in a circumferential direction of the coil assembly, and each of the plurality of universal balls is rotatably disposed in a corresponding one of the plurality of positioning portions.

8. The voice coil motor of claim 1, wherein the first base defines a plurality of first ball grooves on a side surface of the first base facing the second base, the plurality of first ball grooves are arranged in at least one circle in a circumferential direction of the coil assembly, wherein the second base defines a plurality of second ball grooves on a side surface of the second base facing the first base, the plurality of second ball grooves respectively correspond to the plurality of first ball grooves, and each of the plurality of first ball grooves and a corresponding one of the plurality of second ball grooves cooperate to receive the universal ball.

9. The voice coil motor of claim 7, wherein a first anti-collision member is disposed at a position where the first base is in contact with the universal ball, and a second anti-collision member is disposed at a position where the positioning portion is in contact with the universal ball.

10. The voice coil motor of claim 1, wherein a magnetic conductive member is disposed in the cover, and the magnetic assembly and the magnetic conductive member are configured to attract each other to position the magnetic assembly to the cover.

11. The voice coil motor of claim 1, wherein the cover is provided with a plurality of damping pins extending towards the coil assembly, the coil assembly comprises a carrier, the carrier defines a plurality of damping holes respectively corresponding to the plurality of damping pins, and each of the plurality of damping pins is inserted into a corresponding one of the plurality of damping holes.

12. The voice coil motor of claim 11, wherein each of the plurality of damping holes is provided with a damping material.

13. The voice coil motor of claim 11, wherein the carrier is provided with a plurality of first collision bosses at a surface of the carrier close to the cover and a plurality of second collision bosses at a surface of the carrier close to the first base.

14. The voice coil motor of claim 1, wherein the autofocus mechanism further comprises a first resilient member connected between the coil assembly and the cover and a second resilient member connected between the coil assembly and the first base, and the first resilient member and the second resilient member are configured to move the coil assembly to reset.

15. The voice coil motor of claim 1, further comprising a circuit board module disposed at one side of the second base away from the first base, wherein the circuit board module is electrically connected to the coil assembly and the coil module.

16. The voice coil motor of claim 15, wherein the circuit board module comprises a bottom plate arranged on the second base and a conductive member connected to and surrounding the bottom plate, the bottom plate is electrically connected to the coil module, the conductive member is electrically connected to the coil assembly, and an avoidance groove is defined between part of the conductive member and the bottom plate.

17. The voice coil motor of claim 16, wherein a metal wire is disposed inside the cover and electrically connected to the coil assembly, and one end of the metal wire extends outside of the cover to be connected to the conductive member.

18. A camera, comprising:

a voice coil motor, a lens module, and a photosensitive chip disposed at the voice coil motor; wherein wherein the voice coil motor comprises an autofocus mechanism and an in-body image stabilization (IBIS) mechanism;

wherein the autofocus mechanism comprises a first base, a cover arranged on the first base, a coil assembly disposed between the first base and the cover, and a magnetic assembly arranged on the cover and around the coil assembly;

wherein the IBIS mechanism comprises a second base disposed at one side of the first base away from the cover and a coil module arranged on the second base; when the coil assembly is energized, a first electromagnetic force is generated between the coil assembly and the magnetic assembly to drive the coil assembly to move in an axial direction, wherein the axial direction is a direction parallel to a center axis of the coil assembly; and wherein when the coil module is energized, a second electromagnetic force is generated between the coil module and the magnetic assembly to drive the second base and the coil module to move relative to the first base; and wherein the lens module is connected to the coil assembly of the voice coil motor, the voice coil motor is configured to drive the coil assembly to move so that the lens module is driven to move under movement of the coil assembly, and the voice coil motor is further configured to drive the photosensitive chip to move relative to the lens module;

wherein the second base is provided with a magnetic conductive member corresponding to the magnetic assembly, the magnetic conductive member and the magnetic assembly are configured to magnetically attract each other, the second base is connected to the first base through a plurality of universal balls, and the second base is spaced apart from the first base.

19. An electronic device, comprising:

a housing, a main board disposed inside the housing, and a camera, the camera comprising a voice coil motor, a lens module, and a photosensitive chip disposed at the voice coil motor, and the camera being disposed inside the housing and electrically connected to the main board;

wherein the voice coil motor comprises an autofocus mechanism and an in-body image stabilization (IBIS) mechanism;

wherein the autofocus mechanism comprises a first base, a cover arranged on the first base, a coil assembly disposed between the first base and the cover, and a magnetic assembly arranged on the cover and around the coil assembly;

wherein the IBIS mechanism comprises a second base disposed at one side of the first base away from the cover and a coil module arranged on the second base; when the coil assembly is energized, a first electromagnetic force is generated between the coil assembly and the magnetic assembly to drive the coil assembly to move in an axial direction, wherein the axial direction is a direction parallel to a center axis of the coil assembly; and wherein when the coil module is energized, a second electromagnetic force is generated between the coil module and the magnetic assembly to drive the second base and the coil module to move relative to the first base;

wherein the second base is provided with a magnetic conductive member corresponding to the magnetic assembly, the magnetic conductive member and the magnetic assembly are configured to magnetically attract each other, the second base is connected to the first base through a plurality of universal balls, and the second base is spaced apart from the first base; and wherein the lens module is connected to the coil assembly of the voice coil motor, the voice coil motor is configured to drive the coil assembly to move so that the lens module is driven to move under movement of the coil assembly, and the voice coil motor is further configured to drive the photosensitive chip to move relative to the lens module.

* * * * *